US012795502B2

(12) United States Patent
Kalkunte et al.

(10) Patent No.: US 12,795,502 B2
(45) Date of Patent: *Nov. 10, 2026

(54) COMMUNICATION SYSTEM AND METHOD FOR OPERATING 5G MESH NETWORK FOR ENHANCED COVERAGE AND ULTRA-RELIABLE COMMUNICATION

(71) Applicant: PELTBEAM INC., Sherman Oaks, CA (US)

(72) Inventors: Venkat Kalkunte, Saratoga, CA (US); Mehdi Hatamian, Mission Viejo, CA (US); Puya Rofougaran, Irvine, CA (US); Arman Rofougaran, Newport Coast, CA (US)

(73) Assignee: Peltbeam Inc., Sherman Oaks, CA (US)

( * ) Notice: Subject to any disclaimer, the term of this patent is extended or adjusted under 35 U.S.C. 154(b) by 13 days.

This patent is subject to a terminal disclaimer.

(21) Appl. No.: 19/032,140

(22) Filed: Jan. 20, 2025

(65) Prior Publication Data

US 2026/0136267 A1 May 14, 2026

Related U.S. Application Data

(63) Continuation of application No. 18/764,806, filed on Jul. 5, 2024, now Pat. No. 12,238,631, which is a (Continued)

(51) Int. Cl.
*H04W 40/12* (2009.01)
*H04B 17/318* (2015.01)
(Continued)

(52) U.S. Cl.
CPC .......... *H04W 40/12* (2013.01); *H04B 17/318* (2015.01); *H04W 8/005* (2013.01);
(Continued)

(58) Field of Classification Search
CPC ... H04W 76/15; H04W 76/10; H04W 40/026; H04W 40/20; H04W 40/28; H04W 40/12
See application file for complete search history.

(56) References Cited

U.S. PATENT DOCUMENTS 6,671,265 B1 12/2003 Hwang et al.
6,907,243 B1 6/2005 Patel
(Continued)

OTHER PUBLICATIONS

Notice of Allowance for U.S. Appl. No. 19/203,462 dated Jun. 18, 2025.
(Continued)

*Primary Examiner* — Shukri Taha
(74) *Attorney, Agent, or Firm* — CHIP LAW GROUP

(57) ABSTRACT

A communication system that includes a processor to control a first set of edge devices of a plurality of edge devices to establish a primary communication path to service one or more user equipment (UEs) for uplink and downlink communication, wherein each edge device of the plurality of edge devices is configured as a mesh node of a mesh network, and control switching from the primary communication path to a secondary communication path within a threshold time based on a presence of a signal obstruction in the primary communication path to maintain a continuity in the service to the one or more UEs for the uplink and downlink communication.

20 Claims, 13 Drawing Sheets

Related U.S. Application Data continuation of application No. 18/481,454, filed on Oct. 5, 2023, now Pat. No. 12,177,761, which is a continuation of application No. 18/341,234, filed on Jun. 26, 2023, now Pat. No. 11,825,398, which is a continuation of application No. 18/147,518, filed on Dec. 28, 2022, now Pat. No. 11,706,686, which is a continuation of application No. 17/806,562, filed on Jun. 13, 2022, now Pat. No. 11,570,687.

(60) Provisional application No. 63/262,564, filed on Oct. 15, 2021.

(51) Int. Cl.

| | |
|---|---|
| ***H04W 8/00*** | (2009.01) |
| ***H04W 16/28*** | (2009.01) |
| ***H04W 40/02*** | (2009.01) |
| ***H04W 40/20*** | (2009.01) |
| ***H04W 40/28*** | (2009.01) |
| ***H04W 48/16*** | (2009.01) |
| ***H04W 64/00*** | (2009.01) |
| ***H04W 76/10*** | (2018.01) |
| ***H04W 76/15*** | (2018.01) |

(52) U.S. Cl.

CPC ......... *H04W 16/28* (2013.01); *H04W 40/026* (2013.01); *H04W 40/20* (2013.01); *H04W 40/28* (2013.01); *H04W 48/16* (2013.01); *H04W 64/003* (2013.01); *H04W 76/10* (2018.02); *H04W 76/15* (2018.02)

(56) References Cited

U.S. PATENT DOCUMENTS

| | | | | |
|---|---|---|---|---|
| 10,581,736 | B1 | 3/2020 | Choudhury et al. | |
| 11,191,013 | B1 | 11/2021 | Kalkunte et al. | |
| 11,275,147 | B1 | 3/2022 | Kalkunte et al. | |
| 11,425,034 | B1 | 8/2022 | Boopathy et al. | |
| 11,570,687 | B1 * | 1/2023 | Kalkunte | H04W 40/12 |
| 2008/0304485 | A1 | 12/2008 | Sinha et al. | |
| 2010/0189115 | A1 | 7/2010 | Kitada | |
| 2011/0235568 | A1 | 9/2011 | Esteves et al. | |
| 2015/0195192 | A1 | 7/2015 | Vasseur et al. | |
| 2015/0282147 | A1 | 10/2015 | Schmidt et al. | |
| 2016/0094398 | A1 | 3/2016 | Choudhury et al. | |
| 2016/0174124 | A1 | 6/2016 | Basu Mallick et al. | |
| 2016/0344572 | A1 * | 11/2016 | Brust | H04L 43/16 |
| 2017/0026292 | A1 | 1/2017 | Smith et al. | |
| 2017/0142619 | A1 | 5/2017 | Petrick | |
| 2018/0026731 | A1 | 1/2018 | Kim | |
| 2018/0254972 | A1 | 9/2018 | Patel et al. | |
| 2019/0053296 | A1 | 2/2019 | Balappanavar et al. | |
| 2019/0372837 | A1 | 12/2019 | Yang et al. | |
| 2020/0396655 | A1 * | 12/2020 | Wu | H04W 36/083 |
| 2020/0403689 | A1 | 12/2020 | Rofougaran et al. | |
| 2021/0051765 | A1 | 2/2021 | Rosenschild et al. | |
| 2021/0068170 | A1 | 3/2021 | Sadhu et al. | |
| 2021/0076299 | A1 | 3/2021 | Chunduri et al. | |
| 2021/0159946 | A1 | 5/2021 | Raghavan et al. | |
| 2021/0368308 | A1 | 11/2021 | Katardjiev et al. | |
| 2022/0014963 | A1 | 1/2022 | Yeh et al. | |
| 2022/0167342 | A1 | 5/2022 | Raghavan et al. | |
| 2025/0351032 | A1 * | 11/2025 | Esswie | H04W 36/008357 |

OTHER PUBLICATIONS

Non-Final Office Action for U.S. Appl. No. 17/810,199 dated Oct. 15, 2024.

Non-Final Office Action for U.S. Appl. No. 18/764,806 dated Aug. 23, 2024.

Notice of Allowance for U.S. Appl. No. 17/658,045 dated Nov. 7, 2022.

Notice of Allowance for U.S. Appl. No. 17/806,562 dated Sep. 22, 2022.

Notice of Allowance for U.S. Appl. No. 17/810,199 dated Feb. 19, 2025.

Notice of Allowance for U.S. Appl. No. 17/951,486 dated Nov. 28, 2022.

Notice of Allowance for U.S. Appl. No. 18/147,518 dated Mar. 2, 2023.

Notice of Allowance for U.S. Appl. No. 18/481,454 dated May 10, 2024.

Notice of Allowance for U.S. Appl. No. 18/764,806 dated Oct. 18, 2024.

Notice of Allowance in U.S. Appl. No. 17/658,045 dated Jun. 15, 2022.

Non-Final Office Action for U.S. Appl. No. 19/407,143 dated Feb. 12, 2026.

Notice of Allowance for U.S. Appl. No. 19/284,840, dated Sep. 9, 2025.

Final Office Action for U.S. Appl. No. 19/407,143 dated Apr. 16, 2026.

* cited by examiner

702

Downstream

| Relay number | Relay bb index | Location Coordinates | Downstream Donor bb index | Distance vector | Link state A-Active D- Dormant | Tags |
|---|---|---|---|---|---|---|
| 1 | | | | Heading LAT/LON | D | Tag-d1 |
| 2 | | | | | A | Tag-d2 |

704

Upstream

| Radio Parameters per Path | Relay bb index | Location Coordinates | Donor bb index | Distance vector-GPS/Heading | Link state A-Active D- Dormant | Tags |
|---|---|---|---|---|---|---|
| 1 | | | | | | Tag-u1 |
| 2 | | | | | | Tag-u2 |

FIG. 7

COMMUNICATION SYSTEM AND METHOD FOR OPERATING 5G MESH NETWORK FOR ENHANCED COVERAGE AND ULTRA-RELIABLE COMMUNICATION

CROSS-REFERENCE TO RELATED APPLICATIONS/INCORPORATION BY REFERENCE

This Patent Application makes reference to, claims priority to, claims the benefit of, and is a Continuation Application of U.S. patent application Ser. No. 18/764,806, filed on Jul. 5, 2024, which claims priority to U.S. Pat. No. 12,177,761, issued on Dec. 24, 2024, which claims priority to U.S. Pat. No. 11,825,398, issued on Nov. 21, 2023, which claims priority to U.S. Pat. No. 11,706,686, issued on Jul. 18, 2023, which claims priority to U.S. Pat. No. 11,570,687, issued on Jan. 31, 2023, which claims priority to U.S. Provisional Application Ser. No. 63/262,564 filed on Oct. 15, 2021. The above-referenced Applications are hereby incorporated herein by reference in their entirety.

FIELD OF TECHNOLOGY

Certain embodiments of the disclosure relate to a wireless communication system. More specifically, certain embodiments of the disclosure relate to a communication system and a communication method for operating a fifth generation (5G) mesh network for enhanced coverage (e.g., enhancing 5G cellular coverage to overcome signal blockage regions) and ultra-reliable high-performance communication.

BACKGROUND

Wireless telecommunication in modern times has witnessed the advent of various signal transmission techniques and methods, such as the use of beamforming and beam steering techniques, for enhancing the capacity of radio channels. Latency and high volume of data processing are considered prominent issues with next-generation networks, such as 5G. Currently, the use of edge computing in next-generation networks, such as 5G and upcoming 6G, is an active area of research, and many benefits have been proposed, for example, faster communication between vehicles, pedestrians, and infrastructure, and other communication devices. For example, it is proposed that close proximity of conventional edge devices to user equipment (UEs) may likely reduce the response delay usually suffered by UEs while accessing the traditional cloud. However, there are many open technical challenges for successful and practical use of edge computing in the next generation networks, especially in 5G or the upcoming 6G environment. For example, how to increase coverage of a radio access network (RAN) node (e.g., a small cell or a gNB) for various indoor and outdoor applications without decreasing throughput and while maintaining quality of service (QoS). In a second example, Quality of experience (QoE) is another open issue, which is a measure of a user's holistic satisfaction level with a service provider (e.g., Internet access, phone call, or other carrier network-enabled services). The challenge is how to ensure seamless connectivity as well as QoE given the dynamic nature of the environment without significantly increasing infrastructure cost.

Further limitations and disadvantages of conventional and traditional approaches will become apparent to one of skill in the art through comparison of such systems with some aspects of the present disclosure as set forth in the remainder of the present application with reference to the drawings.

BRIEF SUMMARY OF THE DISCLOSURE

A communication system and a communication method for operating a 5G mesh network for enhanced coverage (e.g., enhancing 5G cellular coverage to overcome signal blockage regions) and ultra-reliable high-performance communication, substantially as shown in and/or described in connection with at least one of the figures, as set forth more completely in the claims.

These and other advantages, aspects, and novel features of the present disclosure, as well as details of an illustrated embodiment thereof, will be more fully understood from the following description and drawings.

BRIEF DESCRIPTION OF DRAWINGS

FIG. 7 is a diagram that illustrates reachability tables for upstream and downstream communication generated by the central cloud server, in accordance with an embodiment of the disclosure.

DETAILED DESCRIPTION OF THE DISCLOSURE

Certain embodiments of the disclosure may be found in a communication system and a communication method for operating a 5G mesh network for enhanced 5G cellular coverage and ultra-reliable high-performance communication. The communication system and the communication method of the present disclosure ensure seamless connectivity, improves 5G coverage of a radio access network (RAN) node (e.g., a 5G enabled small cell or a gNB), overcomes signal blockage regions by use of the mesh network (e.g., a 5G mesh network) formed dynamically by a plurality of edge devices under the control of a central cloud server of the communication system, and further enhances Quality of Experience (QoE). The communication system and the method of the present disclosure significantly improves performance in terms of data throughput and signal-to-noise ratio (SNR) of one or more end-user devices (e.g., UEs) when employed in indoors, outdoors, or a combination thereof. The communication system and the method of the present disclosure significantly enhance the coverage of the RAN node to overcome signal blockage regions within a building (i.e., indoors) as well as outside a building (i.e., outdoors, such as nooks and corners around the building) and provides seamless connectivity as well as QoE without significantly increasing infrastructure cost with consistent high-speed, low latency wireless connectivity with improved coverage for ultra-reliable communication. In the following description, reference is made to the accompanying drawings, which form a part hereof, and in which is shown, by way of illustration, various embodiments of the present disclosure.

Figure 1:
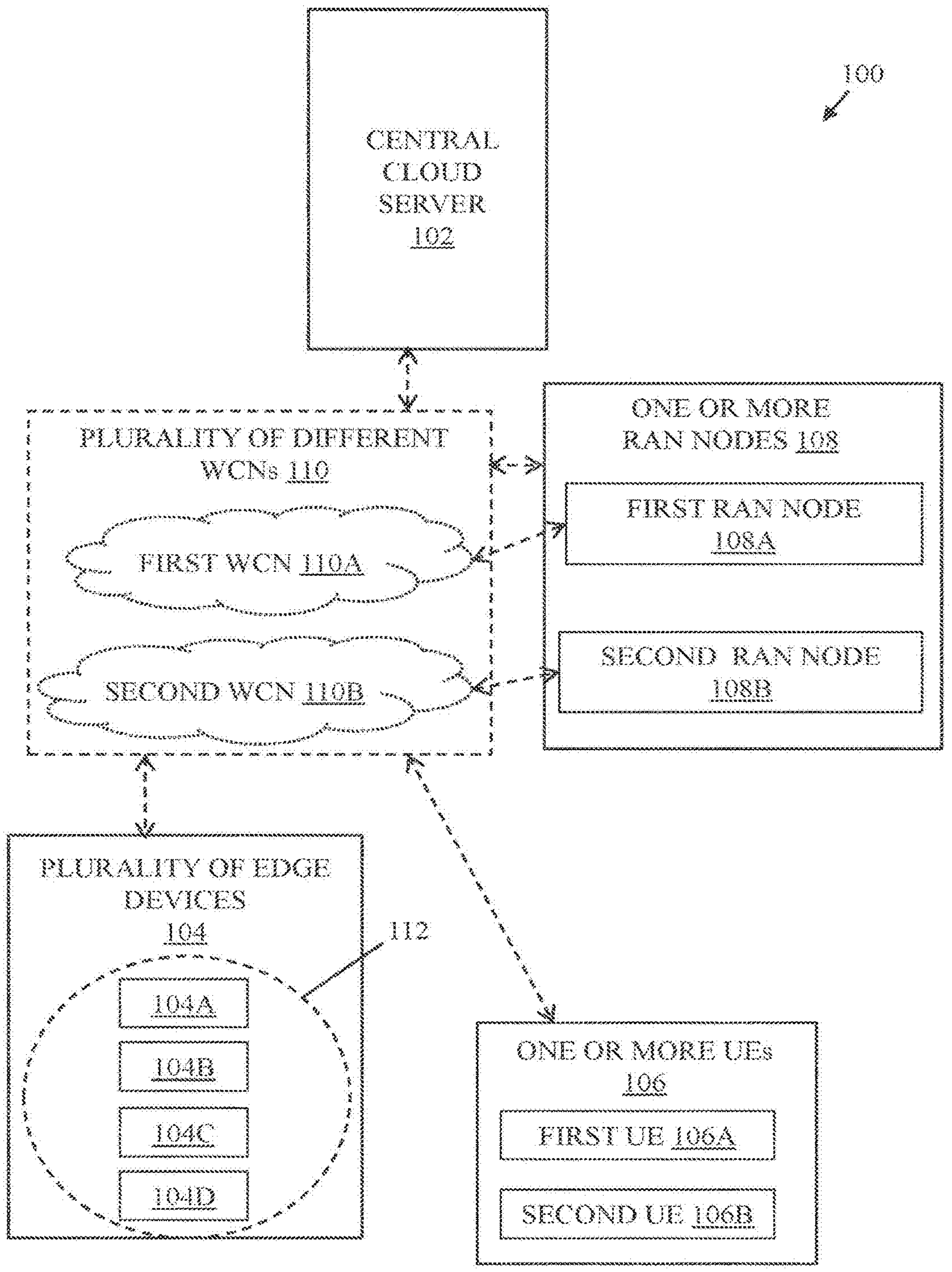
FIG. 1 is a network environment diagram illustrating various components of an exemplary communication system with a central cloud server and a plurality of edge devices, in accordance with an exemplary embodiment of the disclosure.

FIG. 1 is a network environment diagram illustrating various components of an exemplary communication system with a central cloud server and a plurality of edge devices, in accordance with an exemplary embodiment of the disclosure. With reference to FIG. 1, there is shown a network environment diagram of a communication system 100 that includes a central cloud server 102 and a plurality of edge devices 104, such as edge devices 104A, 104B, 104C, and 104D. The communication system 100 may further include one or more user equipment (UEs) 106 and one or more radio access network (RAN) nodes 108. There is further shown a plurality of different wireless carrier networks (WCNs) 110, such as a first WCN 110A of a first service provider and a second WCN 110B of a second service provider. There is further shown a mesh network 112 formed by the plurality of edge devices 104, such as the edge devices 104A, 104B, 104C, and 104D.

The central cloud server 102 includes suitable logic, circuitry, and interfaces that may be configured to communicate with the plurality of edge devices, such as edge devices 104A, 104B, 104C, and 104D, one or more UEs 106 (e.g., the first UE 106A and/or the second UE 106B) and one or more RAN nodes 108 (e.g., the first RAN node 108A and/or the second RAN node 108B). In an example, the central cloud server 102 may be a remote management server that is managed by a third party different from the service providers associated with the one or more RAN nodes 108. In another example, the central cloud server 102 may be a remote management server or a data center that is managed by a third party, or jointly managed, or managed in coordination and association with one or more of a plurality of different wireless carrier networks (WCNs) 110 or network operators, such as the first WCN 110A associated with the first RAN node 108A and the second WCN110B associated with the second RAN node 108B. In an implementation, the central cloud server 102 may be a master cloud server or a master machine that is a part of a data center that controls an array of other cloud servers communicatively coupled to it for load balancing, running customized applications, and efficient data management.

Each edge device of the plurality of edge devices 104, such as edge devices 104A, 104B, 104C, and 104D, includes suitable logic, circuitry, and interfaces that may be configured to communicate with the central cloud server 102. Each of the plurality of edge devices 104, such as edge devices 104A, 104B, 104C, and 104D, may be referred to as a mesh node or a mesh point of the mesh network 112 formed by the plurality of edge devices 104. Examples of the plurality of edge devices 104 may include, but may not be limited to, an XG-enabled repeater device, an XG-enabled relay device, an XG-enabled customer premise equipment (CPE), an XG-enabled fixed wireless access (FWA) device, an XG-enabled edge communication device, where the XG corresponds to 5G or 6G communication. In an implementation, the XG-enabled repeater device may be a smart repeater device that acts as an integrated CPE and relay device with smart beamforming functions.

Each of one or more UEs 106, such as the first UE 106A and the second UE 106B, may correspond to telecommunication hardware used by an end-user to communicate. Alternatively stated, each of the one or more UEs 106 may refer to a combination of mobile equipment and subscriber identity module (SIM). Each of the one or more UEs 106, such as the first UE 106A and the second UE 106B, may be a subscriber of at least one of the plurality of different WCNs 110. Examples of the one or more UEs 106 may include but are not limited to, a smartphone, a destination device, a virtual reality headset, an augmented reality device, a vehicle, a wireless modem, a home router, a smart television (TV), an Internet-of-Things (IoT) device, or any other customized hardware for telecommunication or a consumer electronic (CE) device capable of wireless communication.

Each of the one or more RAN nodes 108, such as the first RAN node 108A or the second RAN node 108B, may be a fixed point of communication that may communicate information, in the form of a plurality of beams of RF signals, to and from communication devices, such as the first UE 106A, and the plurality of edge devices 104. Each of the one or more RAN nodes 108, such as the first RAN node 108A or the second RAN node 108B, may be a small cell or a base station, such as a gNB (i.e., a 5G radio base station). Multiple base stations and small cells corresponding to one service provider may be geographically positioned to cover specific geographical areas. Typically, bandwidth requirements serve as a guideline for a location of a base station and small cell. The count of base stations and small cells depends on population density and geographic irregularities, such as buildings and mountain ranges, which may interfere with the plurality of beams of RF signals. In this case, two RAN nodes, such as the first RAN node 108A and the second RAN node 108B, are shown but in practice there may be many more RAN nodes. In another implementation, the one or more RAN nodes 108 may include eNBs, Master eNBs (MeNBs) (for non-standalone mode), gNBs, and 5G enabled small cells.

Each of the plurality of different WCNs 110 is owned, managed, or associated with a mobile network operator (MNO), also referred to as a mobile carrier, a cellular company, or a wireless service provider that provides services, such as voice, SMS, MMS, Web access, data services, and the like, to its subscribers, over a licensed radio spectrum. Each of the plurality of different WCNs 110 may own or control elements of a network infrastructure to provide services to its subscribers over the licensed spectrum, for example, 4G LTE, or 5G spectrum (FR1 or FR2). For example, the first RAN node 108A may be controlled, managed, or associated with the first WCN 110A, and the second RAN node 108B may be controlled, managed, or associated with the second WCN 110B different from the first WCN 110A. The plurality of different WCNs 110 may also include mobile virtual network operators (MVNO).

The mesh network 112 may refer to a 5G mesh network where each edge device cooperate with two or more other neighboring nodes (e.g., one neighboring edge device in upstream and two or more neighboring edge devices in downstream) and are dynamically linked with each other to enable enhancing the 5G cellular coverage of a RAN node, such as the first RAN node 108A, to overcome signal blockage regions within a building (i.e., indoors) as well as outside a building (i.e., outdoors) for ultra-reliable high-performance communication. In this case, the downstream may refer to what a given edge device may be looking to relay down to its next mesh point (i.e., neighboring edge device or neighboring node from one or more relay antenna arrays, e.g., its two relays). The upstream may be defined from a perspective of communication from the donor side of each edge device (i.e., towards its upstream neighboring node).

Beneficially, the central cloud server 102 and the plurality of edge devices 104 exhibit a decentralized model that not only brings cloud computing capabilities closer to UEs (such as the one or more UEs 106) in order to reduce latency but also manifests several known benefits for various service providers associated with the plurality of different WCNs 110. For example, it reduces backhaul traffic by provisioning content at the edge, distributes computational resources geographically in different locations (e.g., on-premises mini cloud, central offices, customer premises, etc.,) depending on the use case requirements, and improves the reliability of a network by distributing content between edge devices and the centralized cloud server 102. Apart from these and other known benefits (or inherent properties) of edge computing, the central cloud server 102 improves and solves many open issues related to the convergence of edge computing and the next-generation wireless networks, such as 5G or upcoming 6G. The central cloud server 102 significantly improves the beam management mechanism of 5G new radio (NR), true 5G, and creates a platform for upcoming 6G communications, to achieve low latency and high data rate requirements. The dynamic generation and operation of the mesh network 112 removes the complexity and improves coverage of the first RAN node 108A for indoor and outdoor applications. The central cloud server 102 is able to handle heterogeneity in wireless communication in terms of different interfaces, radio access technologies (3G, 4G, 5G, or upcoming 6G), computing technologies (e.g., hardware and operating systems), and even one or more carrier networks of the plurality of different WCNs 110 used by the one or more UEs 106. Moreover, the central cloud server 102 considers the dynamic nature of surroundings holistically by use of the information via the discovery process obtained from the plurality of edge devices 104 in real-time or near real-time to proactively avoid any adverse impact on reliability due to any sudden signal blockage, signal fading, signal scattering, or signal loss, thereby provisioning consistent high-speed, low latency wireless connectivity with improved coverage. Thus, the central cloud server 102 manifest higher QoE as compared to existing systems. Additionally, in some cases, initial access information may be provided in real-time or near real-time via the mesh network 112 and switching of communication paths in the mesh network 112 may occur in less than 100 milliseconds, thereby proactively handling and avoiding existing signaling overhead issues that result from quick variations of wireless channels. Furthermore, the mesh network substantially reduces the battery draining issue of the one or more UEs 106 when present indoors or when in motion.

Figure 2:
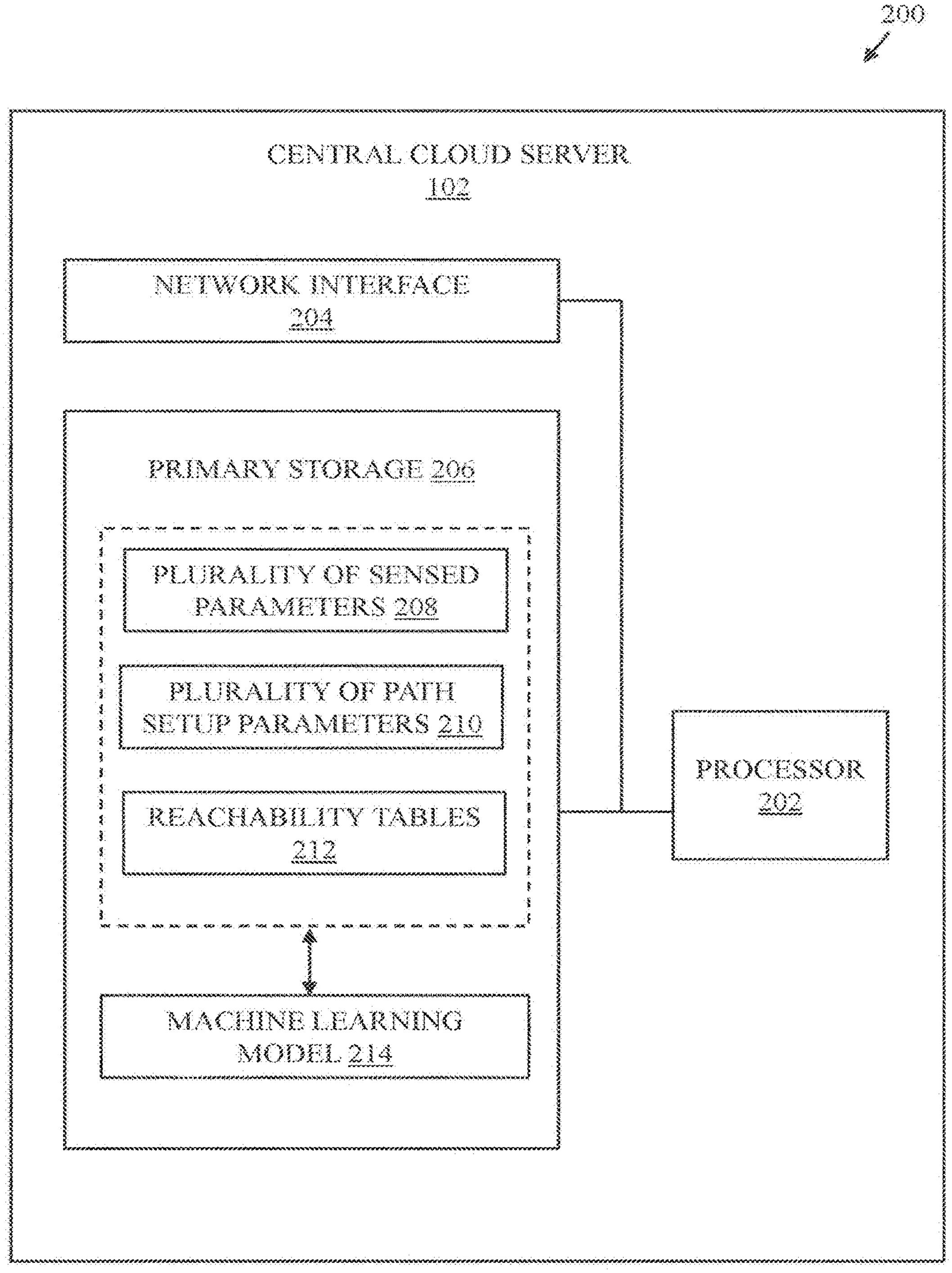
FIG. 2 is a block diagram illustrating different components of an exemplary central cloud server, in accordance with an embodiment of the disclosure.

FIG. 2 is a block diagram illustrating different components of an exemplary central cloud server, in accordance with an embodiment of the disclosure. FIG. 2 is explained in conjunction with elements from FIG. 1. With reference to FIG. 2, there is shown a block diagram 200 of the central cloud server 102. The central cloud server 102 may include a processor 202, a network interface 204, and a primary storage 206. The primary storage 206 may further include a plurality of sensed parameters 208, a plurality of path setup parameters 210, and reachability tables 212. In some implementations, the primary storage 206 may further include a machine learning model 214.

In accordance with an embodiment, each of the plurality of edge devices 104 may be deployed at different locations. For example, each of the plurality of edge devices 104 may be an edge repeater device deployed at a corresponding fixed location to provide a non-line-of-sight (NLOS) transmission path between the one or more RAN nodes 108 and the one or more UEs 106.

In operation, the processor 202 may be configured to cause each of a plurality of edge devices 104 to initiate a discovery process. The discovery process may also be referred to as a discovery protocol or a discovery operation. In an implementation, the central cloud server 102 may be configured to communicate an initiate command to initiate the discovery process at each of the plurality of edge devices 104.

In accordance with an embodiment, in the discovery process, the processor 202 may be further configured to cause each edge device to determine location information of a plurality of neighboring nodes around each edge device of the plurality of edge devices 104. The plurality of neighboring nodes may comprise the two or more neighboring edge devices of the plurality of edge devices 104 or a combination of the two or more neighboring edge devices and the one or more RAN nodes 108 including the first RAN node 108A. Alternatively stated, the discovery process may comprise determining location information of a plurality of neighboring nodes. For example, the edge device 104C may determine its location and also location of the neighboring nodes, such as other nearby edge devices 104A, 104B, and 104D. In some implementations, each edge device of the plurality of edge devices 104 may further comprise a position sensor (e.g., a gyroscope) or a location sensor (e.g., a global positioning system (GPS) sensor or other geospatial location sensor). In such a case, each edge device may determine its location coordinates by use of the position or the location sensor. For example, each edge device may utilize the position sensor and/or the location sensor for outdoor localization (i.e., to determine its location coordinates). In another example, in case of indoor deployment, each edge device may further include Wi-Fi capability, which may be used, for example, to determine its location coordinates or location coordinates of neighboring nodes (e.g., nearby edge devices implemented as mesh nodes) by indoor received signal strength indication (RSSI)-based triangulation or WI-FI™-based triangulation process, known in the art.

In another exemplary implementation, at the time of deployment of the plurality of edge devices 104, a location of each of the plurality of edge devices 104 may be uploaded to the central cloud server 102 along with an identity of the corresponding edge device. The location coordinates may be determined by any other known methods of location estimation, such as a triangulation method, using sounding waves, using sensors, a Radar provided in one or more edge devices, BLUETOOTH™, RSSI from client etc. The discovery of location of each edge device of the plurality of edge devices 104 (i.e., mesh nodes) may be done by any methods known in the art.

In an implementation, the plurality of edge devices 104, such as the edge devices 104A, 104B, 104C, and 104D, may be deployed strategically at different locations to increase coverage and overcome signal blockage so that a beam of RF signal can reach a location previously not reachable. For example, at nooks and corners of a building of an enterprise, behind a building, inside the building at different locations to overcome blockages and at least to create a line-of-sight path with two neighboring nodes. In an example, the plurality of edge devices, such as edge devices 104A, 104B, 104C, and 104D, may be deployed as a private mesh network created for an enterprise. Typically, inter distances among the plurality of edge devices 104 (i.e., the mesh nodes) deployed indoors in an enterprise may be 60-90 meters or 70-80 meters. In another example, the plurality of edge devices 104, such as edge devices 104A, 104B, 104C, and 104D, may be deployed as a public network or a combination of a public and private mesh network for end users.

Each edge device of the plurality of edge devices 104 may comprise a donor antenna array and one or more relay antenna arrays. In an implementation, each edge device may comprise a donor (i.e., a donor antenna array) and two relays (i.e., two relay antenna arrays). In the discovery process, it is to be discovered which beam index to select at both the donor side and the relay side of each device of the plurality of edge device 104. Accordingly, the processor 202 may be further configured to cause each edge device to transmit or fire a plurality of different beams from the donor antenna array and the one or more relay antenna arrays of each device of the plurality of edge devices 104. The plurality of different beams may be fired by the donor antenna array of each device of the plurality of edge devices 104 by selecting different beam indexes of a beam book at the donor antenna array. Similarly, the plurality of different beams may be fired by each of the one or more relay antenna arrays of each edge device of the plurality of edge devices 104 by selecting different beam indexes of the beam book at the one or more relay antenna arrays. Each edge device of the plurality of edge devices 104 may be further configured to measure Equivalent Isotropic Radiated Power (EIRP) or RSSI of each fired beam by the donor the donor antenna array and the one or more relay antenna arrays. The plurality of different beams fired from the donor antenna array may also be referred to as a plurality of first fired beams and the measured signal strength of each fired beams at the donor side of each edge device (e.g., at a neighboring node) may be referred to as a first beam measurement information. Similarly, the plurality of different beams fired from the one or more relay antenna array may also be referred to as a plurality of second fired beams and the measured signal strength of each fired beams at the relay side of each edge device (e.g., at a neighboring node) may be referred to as a second beam measurement information.

In accordance with another embodiment, the processor 202 may be further configured to obtain a plurality of sensed parameters 208 from each edge device of the plurality of edge devices 104 based on the discovery process at each edge device of the plurality of edge devices 104. The plurality of sensed parameters 208 are associated with the donor antenna array and the one or more relay antenna arrays of each edge device. The plurality of sensed parameters 208 are assessed at each edge device with respect to its corresponding two or more neighboring edge devices. In accordance with an embodiment, the plurality of sensed parameters 208 obtained periodically from each edge device may comprise the first beam measurement information for the plurality of first fired beams by the donor antenna array of each edge device for a plurality of different donor beam indexes at each edge device of the plurality of edge devices 104. The first beam measurement information include signal strength values for each of the plurality of first fired beams at the receiver side (e.g., signal strength of beams received at other nearby edge devices of each edge device). The plurality of sensed parameters 208 may further comprise the second beam measurement information for the plurality of second fired beams by the one or more relay antenna arrays of each edge device for a plurality of different relay beam indexes at each edge device of the plurality of edge devices 104. The second beam measurement information include signal strength values for each of the plurality of second fired beams (fired by the one or more relay antenna arrays) at the receiver side (e.g., signal strength of beams received at other nearby edge devices of each edge device). The plurality of sensed parameters 208 obtained from each edge device of the plurality of edge devices 104 may further include location coordinates and measurement data (e.g., the signal strength values in terms of received signal strength indicator (RSSI), transmitted signal strength indicator (TSSI), capability of carrier signals of fired beams to decode Primary Synchronization Signal (PSS) at the receiver side, and the like).

In accordance with an embodiment, the plurality of sensed parameters 208 obtained periodically from each edge device further comprises location coordinates of each edge device and a unique identifier of each edge device of the plurality of edge devices 104. The unique identifier is used to know from which edge device and from which location, the first beam measurement information and the second beam measurement information is obtained by the central cloud server 102. By use of the discovery process, each edge device of the plurality of edge devices 104 may be configured to exchange information with the central cloud server 102.

In accordance with an embodiment, the plurality of edge devices 104 may comprise a root mesh node (e.g., the edge device 104A) communicatively coupled to the first RAN node 108A and a set of child mesh nodes (e.g., the edge devices 104B, 104C, and 104D) that are communicatively coupled directly or indirectly to the root mesh node in the mesh network 112. The root mesh node may be an edge device, such as the edge device 104A, of the plurality of edge devices 104 which may be in a suitable communication range to the first RAN node 108A (e.g., a small cell or a gNB) and/or may be directly linked to the first RAN node 108A. The first RAN node 108A may be a small cell or a gNB that may implement beam sweeping by changing beam direction for each synchronization signal block (SSB) transmission. It is to be understood that the number of different beams transmitted by the first RAN node 108A is determined by how many SSBs are being transmitted within a SSB Burst Set (e.g., a set of SSBs being transmitted in 5 ms window of SSB transmission). Multiple SSBs may be transmitted with a certain interval, and each SSB can be identified by a unique number called SSB index (SSB index 0, 1, 2, 3, . . . , n). Moreover, each SSB is transmitted via a specific beam radiated in a certain direction, and each SSB index may be mapped to each beam.

In accordance with an embodiment, the root mesh node, for example, the edge device 104A may be configured to measure the signal strength of each SSB it detected for a certain period (a period of one SSB Set) and may identify the SSB index with the strongest signal. Thus, the root mesh node, such as the edge device 104A, may be directly linked to the first RAN node 108A (e.g., a small cell or a gNB). The challenge for the root mesh node and the central cloud server 102 is how to reach to the one or more UEs 106 for uplink and downlink communication if there are some signal blockage regions, no direct line-of-sight, inadequate 5G cellular coverage and further which edge devices to employ among the plurality of edge devices 104 to service the one or more UEs 106. In other words, it is a challenge that how to increase coverage of the first RAN node 108A (e.g., a small cell or a gNB) for various indoor and outdoor applications without decreasing throughput and while maintaining quality of service (QoS). Another challenge is how to ensure seamless connectivity as well as QoE without significantly increasing infrastructure cost. The central cloud server 102 achieves and overcomes one or more such technical challenge by dynamically forming the mesh network 112.

In accordance with another embodiment, the processor 202 of the central cloud server 102 may be further configured to determine a plurality of path setup parameters 210 specific for each edge device of the plurality of edge devices 104 based on the obtained plurality of sensed parameters 208 from each edge device of the plurality of edge devices 104. The plurality of path setup parameters 210 determined specific for each edge device may comprise at least location coordinates of the corresponding two or more neighboring edge devices to be connected by each edge device, a donor beam index to be selected for the donor antenna array of each edge device, and one or more relay beam indexes to be selected for the one or more relay antenna arrays of each edge device. The donor beam index identified to be selected for the donor antenna array of each edge device may be the one having highest signal strength or a signal strength greater than a threshold and most suited to establish a communication link with a corresponding upstream neighboring node. Similarly, the one or more relay beam indexes identified to be selected for the one or more relay antenna arrays of each edge device may be the one having highest signal strength or a signal strength greater than a threshold and most suited to establish a corresponding communication link with corresponding one or more downstream neighboring nodes. The processor 202 may be further configured to communicate the plurality of path setup parameters 210 determined specifically for each edge device, to each corresponding edge device of the plurality of edge devices 104, and the mesh network is formed based on the communicated plurality of path setup parameters. The plurality of path setup parameters 210 may be stored in the reachability tables 212. There may be different reachability table used for upstream and the downstream communication. An example of the reachability tables 212 is shown and described in detail, for example, in FIG. 7. In some implementation, the communication of the plurality of path setup parameters 210 and the receipt of the plurality of sensed parameters 208 may be via a management plane that may be out-of-band communication channel. In some implementation, the communication of the plurality of path setup parameters 210 may be via a control plane, for example, using LTE control channel. Thus, the mesh network 112 may be generated and operated via the management plane or the control plane and may be referred to as a location aware path routing mesh network. Based on the communicated plurality of path setup parameters 210 to each corresponding edge device of the plurality of edge devices 104, the processor 202 may be further configured to cause the plurality of edge devices 104 to form the mesh network 112 such that a spatial coverage (e.g., the 5G cellular coverage of the first RAN node 108A) of at least a RAN node, such as the first RAN node 108A, may be increased to serve one or more UEs 106, such as the first UE 106A (previously unreachable due to signal blockage), which are stationary or in motion via the mesh network 112 with a throughput rate greater than a threshold, for example, in a multi-gigabit throughput rate.

In an implementation, the processor 202 may determine the plurality of path setup parameters 210 by use of the machine learning model 214. The machine learning model 214 may be periodically updated on the plurality of data points of the plurality of sensed parameters 208. The processor 202 may cause the machine learning model 214 to find correlation among such data points of the plurality of sensed parameters 208*t* to be used for a plurality of predictions and formulate rules to establish, maintain, and select one or more edge devices in advance for various signal obstruction scenarios to serve the one or more UEs 106 and to identify improved (e.g., optimal) signal transmission paths to reach to the one or more UEs 106. In some implementations, the central cloud server 102 may be further configured to receive information of reflective and signal obstruction objects from the plurality of edge devices 104. In such implementation, the processor 202 may be further configured to detect where reflective objects are located and used that information in radiation pattern of the RF signals, such as 5G signals. The information of reflective and signal obstruction objects may be used to configure the radiation pattern so that it is correlated to areas such that reflection of the communicated RF signals is mitigated or eliminated. This means that when one or more beams of RF signals are communicated from the plurality of edge devices 104, comparatively significantly lower or almost negligible RF signals are reflected back to the plurality of edge devices 104. The location of the reflective objects and the correlation of the areas associated with reflective objects with the radiation pattern to design enhanced or most suited beam configurations may be further used by the processor 202 to formulate rules for later use.

In accordance with an embodiment, the processor 202 may be further configured to cause each edge device to identify a donor beam index, from amongst a plurality of beam indexes stored at each edge device, for the donor antenna array of each edge device. Thereafter, the processor 202 may be further configured to cause each edge device to fire a beam of radio frequency (RF) signal from the donor antenna array of each edge device in a specific direction indicated by the identified donor beam index towards their corresponding upstream neighboring node in order to establish the communication link to the corresponding upstream neighboring node. Thus, the processor 202 may then be configured to cause each device to establish a communication link to a corresponding upstream neighboring node of the plurality of neighboring nodes based on the identified donor beam index for the donor antenna array of each edge device and location information of the corresponding upstream neighboring node. The location information of the corresponding upstream neighboring node indicates a distance between two edge devices, which wants to establish communication so that an appropriate radiation pattern may be selected for the fired beam to establish the communication link to a corresponding upstream neighboring node. In some implementations, the processor 202 may be further configured to cause each edge device to fire the beam of RF signal from the donor antenna array of each edge device in a specific direction indicated by the identified donor beam index towards their corresponding upstream neighboring node in a specific radiation pattern depending on a distance of each edge device from their corresponding upstream neighboring node in order to establish the communication link to the corresponding upstream neighboring node.

Similar to the identification of the most suitable donor beam index, in accordance with an embodiment, the processor 202 may be further configured to cause each edge device to identify one or more relay beam indexes, from amongst a plurality of beam indexes stored at each edge device, for the one or more relay antenna arrays of each edge device. Thereafter, the processor 202 may be further configured to cause each edge device to fire one or more beams of RF signals in one or more specific directions indicated by the identified one or more relay beam indexes towards the one or more corresponding downstream neighboring nodes from the one or more relay antenna arrays in order to establish the one or more communication links to the one or more corresponding downstream neighboring nodes. In one implementation, the processor 202 may be further configured to cause each edge device to fire one or more beams of RF signals from the one or more relay antenna arrays in one or more specific directions indicated by the identified one or more relay beam indexes towards the one or more corresponding downstream neighboring nodes in one or more radiation patterns depending on a corresponding distance of each edge device from the one or more corresponding downstream neighboring nodes in order to establish the one or more communication links. The processor 202 may then cause each edge device to establish one or more communication links to one or more corresponding downstream neighboring nodes of the plurality of neighboring nodes based on the identified one or more relay beam indexes for the one or more relay antenna arrays of each edge device and the location information of each of the one or more corresponding downstream neighboring nodes.

Furthermore, based on the communicated plurality of path setup parameters 210 to each corresponding edge device of the plurality of edge devices 104, the processor 202 may be further configured to cause the plurality of edge devices 104 to form a mesh network 112 such that a spatial coverage of at least the first RAN node 108A may be increased to serve one or more UEs 106 via the mesh network 112 with a throughput rate greater than a threshold (e.g., a multi-gigabit data throughput rate). An example of the formation of the mesh network 112 is further described in detail, in FIGS. 4 to 9.

The processor 202 of the central cloud server 102 may be further be configured to determine a primary communication path between a radio access network (RAN) node (e.g., the first RAN node 108A) and one or more user equipment (UEs) 106 via a first set of edge devices (e.g., the edge devices 104A, 104B, and 104D) of the plurality of edge devices 104. Each edge device of the plurality of edge devices 104 is configured as a mesh node of the mesh network 112. Similarly, the processor 202 of the central cloud server 102 may be further configured to determine a secondary communication path between the RAN node (e.g., the first RAN node 108A) and the one or more UEs 106 via a second set of edge devices (e.g., the edge devices 104A, 104C, and 104D) of the plurality of edge devices 104. In an example, the processor 202 may be configured to use the plurality of path setup parameters 210 to determine the primary communication path and the secondary communication path. The plurality of path setup parameters 210 are stored as a path tag, simply referred to as a tag, where each tag defines a communication link and one or more communication links together may a communication route from a source node (e.g., the root mesh node) to reach a destination node (e.g., the target UE to be served) and vice versa via the mesh network 112. Thus, the communication path may be a communication link, or a communication route depending on how to reach and connect to the end-user to be served. For example, each tag defines the communication link between edge devices of the first set of edge devices, such as between the edge devices 104A and 104B, and also between the edge devices 104B and 104D. In this example, the one or more communication links between the edge devices 104A, 104B, and 104D together may form the primary communication path between the radio access network (RAN) node (e.g., the first RAN node 108A) and the one or more UEs 106.

Each tag may define the communication link between edge devices of the second set of edge devices, such as between the edge devices 104A and 104C, and also between the edge devices 104C and 104D. As a result, the one or more communication link between the edge devices 104A, 104C, and 104D together may establish the secondary communication path between the radio access network (RAN) node (e.g., the first RAN node 108A) and the one or more UEs 106. In an implementation, the primary communication path may be determined through a smaller number of edge devices (i.e., shortest path) of the plurality of edge devices 104 from the RAN node (e.g., the first RAN node 108A) to the one or more UEs 106 with maximum enhanced coverage. Moreover, the secondary communication path may be a backup option that may be determined to provide an alternative path with maximum enhanced coverage and ultra-reliable high-performance communication from the RAN node (e.g., the first RAN node 108A) to the one or more UEs 106 via the second set of edge devices of the plurality of edge devices 104.

In an implementation, the processor 202 may be further configured to determine a plurality of secondary communication paths (i.e., a plurality of backup connectivity options) between the RAN node (e.g., the first RAN node 108A) and the one or more UEs 106 (e.g., the first UE 106A) via different sets of edge devices of the plurality of edge devices 104. In an implementation, each of the plurality of secondary communication paths may be determined based on the tags associated with the plurality of secondary communication paths. Moreover, each path from the plurality of secondary communication paths may be beneficial to provide the enhanced coverage and ultra-reliable high-performance communication from the RAN node (e.g., the first RAN node 108A) to the one or more UEs 106 via different set of edge devices of the plurality of edge devices 104. In another implementation, the processor 202 may be further configured to rank each of the plurality of secondary communication paths in terms of one or more signal quality parameters, and each of the plurality of secondary communication paths is used as backup communication paths in a sequential order based on the ranking. For example, EIRP and RSSI may be the signal quality parameters. In an implementation, the processor 202 may be configured to rank each of the plurality of secondary communication paths based on the tags associated with each of the plurality of secondary communication paths. Furthermore, the secondary communication path with a first rank is used firstly, and similarly, subsequent secondary communication paths may be used as the backup communication paths. In an example, the processor 202 may be configured to constantly track alternative paths in the background for a better secondary communication path based on the ranking of each of the plurality of secondary communication paths. By virtue of ranking each of the plurality of secondary communication paths, the processor 202 may uses the most suitable alternative first and then dynamically selects second alternative when first alternative fails to overcome signal blockage regions within a building (i.e., indoors) as well as outside a building (i.e., outdoors) for ultra-reliable communication, to reach to the destination node to be served.

In accordance with an embodiment, the first set of edge devices are caused amongst the plurality of edge devices 104 in the mesh network 112 to establish the primary communication path to serve the one or more UEs 106 for uplink and downlink communication. It is observed that there is a substantial difference or drop in decibels dB, for example, about 5-8 dB difference when two extreme beam indexes are selected at each device. It is further observed that 5-8 dB difference is enough to substantially increase or decrease the data throughput rate. In some cases, it was observed that the throughput increased from 1 GB to 2.4 GB by the selection of appropriate beam index. Thus, it is initially identified which are the right beams indexes to be selected and it may be determined by finding a heading vector. For example, say using two determined location coordinates of two mesh nodes, the heading vector may be found. However, the firing of beams and collecting of measurement data (e.g., EIRP, RSSI, etc.), may still be executed in the backend. This backend scanning may be executed as there may be some reflective objects or reflective paths at some locations or due to dynamic nature of the environment, and thus one of the previously identified beam index and corresponding beam may become weaker or some other beams may become stronger. Thus, a periodic discovery is performed at each edge device (i.e., each mesh node) to cater to such change in reflective paths. Such path(s) may be kept ready as backup or alternative paths, which may be fallback options. In other words, when a primary path is broken, a secondary path is activated.

The processor 202 of the central cloud server 102 may be further be configured to cause the first set of edge devices (e.g., the edge devices 104A, 104B, and 104D) to establish the determined primary communication path to service the one or more UEs 106 for uplink and downlink communication. The primary communication path may be established based on the communicated path setup parameters specific to each of the first set of edge devices (e.g., the edge devices 104A, 104B, and 104D). The processor 202 of the central cloud server 102 may send the path setup parameters to each mesh point, such as the first set of edge devices (e.g., the edge devices 104A, 104B, and 104D) to service the one or more UEs 106 for uplink and downlink communication.

The processor 202 of the central cloud server 102 may be configured to control switching from the primary communication path to the determined secondary communication path within a threshold time based on a presence of a signal obstruction in the primary communication path to maintain a continuity in the service to the one or more UEs 106 for the uplink and downlink communication. In an implementation, the signal obstruction may be present due to the obstructions or movement of the one or more UEs 106, as a result, the uplink communication and the downlink communication of the corresponding one or more UEs 106 may be affected. The signal blockage or the presence of a signal obstruction in the primary communication path may be known to the processor 202 based on the periodic information received from at least each of the participating edge devices, such as the first set of edge devices (e.g., the edge devices 104A, 104B, and 104D) that are used to form the primary communication path. Thereafter, the processor 202 is configured to maintain continuity in the service to the one or more UEs 106 for the uplink and downlink communication by switching from the primary communication path to the secondary communication path within the threshold time (e.g., less than 100 milliseconds) based on the presence of the signal obstruction in the primary communication path. Thus, the primary communication path may be made dormant, and the secondary communication path may be made active. In one example, in case of signal blockage, even an instruction may be sent in advance to each participating edge device of the primary communication path, to autonomously trigger the switching to the second communication path as it is preloaded with tags corresponding to one or more alternative paths. In another example, the central cloud server 102 may be configured to trigger such switching events based on the periodic information received by each of the plurality of edge devices, for example, via the Open Shortest Path First (OSBF) scheme. In some cases, the signaling may be done via an LTE channel although not frequently to minimize network load. In other words, on attachment failure via the primary communication path, alternate path setup parameters are issued by the central cloud server 102 for path recovery, such as to switch from the primary communication path to the secondary communication path. The path recovery may be autonomously triggered locally at the concerned edge device (e.g., the edge device 104B) or may be directed from the central cloud server 102. By virtue of switching from the primary communication path to the determined secondary communication path within the threshold time, the processor 202 significantly improves performance in terms of data throughput and signal-to-noise ratio (SNR) of one or more end-user devices (e.g., UEs) when employed in indoors, outdoors, or a combination thereof.

In accordance with an embodiment, the control of the switching from the primary communication path to the determined secondary communication path includes gradually decreasing a gain of an active path that corresponds to the primary communication path until the active path becomes dormant. In other words, the presence of the signal obstruction in the primary communication path causes the processor 202 to momentarily check if the primary communication path is able to provide a signal, such that if the PSS can be decoded or not. Moreover, if the PSS cannot be decoded, then the processor 202 may be configured to gradually decrease the gain of the primary communication path, due to which the primary communication path becomes dormant (i.e., inactive). In accordance with another embodiment, the control of the switching from the primary communication path to the determined secondary communication path further includes concomitantly and gradually increasing the gain of a dormant path that corresponds to the secondary communication path until the dormant path becomes a new active path. In an implementation, the change or switching from the primary communication path to the determined secondary communication path within a threshold time (e.g., less than 100 milliseconds) may be considered as a smooth type of change. Such switching may be considered as a smooth type of change where a gain of the currently active path may be decreased gradually and the gain of currently dormant path (i.e., the secondary communication path) is gradually increased, which then becomes active and a new primary communication path. In an example, the processor 202 may be configured to align the timings with the frames for the secondary communication path to concomitantly and gradually increase the gain of the dormant path until the dormant path becomes the new active path.

In accordance with another embodiment, the processor 202 may be configured to periodically check whether the new active path has a signal strength greater than a threshold to maintain the continuity in the service to the one or more UEs for the uplink and downlink communication. The processor 202 may be configured to periodically (i.e., momentarily) check whether the secondary communication path (i.e., new active path) is able to provide signal, such that if the PSS can be decoded at other side (e.g., neighboring mesh node) or not. Further, if the PSS can be decoded, then the secondary communication path has sufficient signal strength greater than the threshold to maintain the continuity in the service to the one or more UEs 106 for the uplink and downlink communication and to enable ultra-reliable high-performance communication in gigabit data rate. In an example, if the PSS cannot be decoded, then the processor 202 may be configured gradually decrease the gain of the new active path, and also to concomitantly and gradually increase the gain of the dormant path from the plurality of secondary communication paths to maintain the continuity in the service to the one or more UEs 106 for the uplink and downlink communication.

In accordance with an embodiment, the central cloud server 102 may be further configured to forecast (i.e., predict for an upcoming time) a signal obstruction in an active communication path based on a learned temporal pattern (e.g., a truck that always obstructs the line of sight (LOS) between two mesh nodes at around 9 am). The active communication path may be one of the primary communication path or the secondary communication path. The central cloud server 102 may reconfigure the mesh network 112 ahead of the signal obstruction in the active communication path to maintain the continuity in the service to the one or more UEs 106 for the uplink and downlink communication. In other words, the central cloud server 102 may be further configured to proactively reconfigure the mesh network 112 by selecting any other predetermined secondary communication path of the plurality of secondary communication paths or any newly determined secondary communication path in real time or near real time even before the signal obstruction actually happens in the active communication path as opposed to reacting to the signal obstruction (or the active path obstruction). The cloud intelligence (e.g., the machine learning model 214) may predict or forecast such signal obstructions based on learned data and can proactively reconfigure the mesh network 112 ahead of any predicted signal obstruction.

In accordance with another embodiment, the control of the switching from the primary communication path to the determined secondary communication path is executed via a management plane of the mesh network 112. In an implementation, the management plane of the mesh network 112 may be controlled by the central cloud server 102. In another example, the management plane of the mesh network 112 may be controlled by a scheduler of the first RAN node 108A (e.g., a small cell). In such a case, the scheduling of switching from the primary communication path to the determined secondary communication path may be controlled ahead-of-time and accordingly switching may be done for an upcoming radio frame when a particular SFN or a sub-frame of a radio frame is detected (i.e., at frame level or even at sub-frame level) so that it is less disruptive for network and a continuity of uplink and downlink communication can be achieved improving the quality of service (QoS).

In accordance with another embodiment, the processor 202 may further be configured to cause at least one edge device of the second set of edge devices to fire one or more beams of radio frequency (RF) signals in one or more specific directions towards one or more new neighboring nodes in order to establish the determined secondary communication path. In an implementation, the location information of the one or more new neighboring nodes indicates a distance between two edge devices which needs to establish communication so that an appropriate radiation pattern may be selected for the fired one or more beams of RF signals to establish the determined secondary communication path to a corresponding new neighboring node. In some implementations, the processor 202 may be further configured to cause each edge device to fire the one or more beams of RF signal from the donor antenna array of each edge device in a specific direction indicated by the identified donor beam index towards their corresponding upstream neighboring node in a specific radiation pattern depending on a distance of each edge device from their one or more new neighboring nodes in order to establish the determined secondary communication path to the corresponding one or more neighboring nodes.

Figure 3:
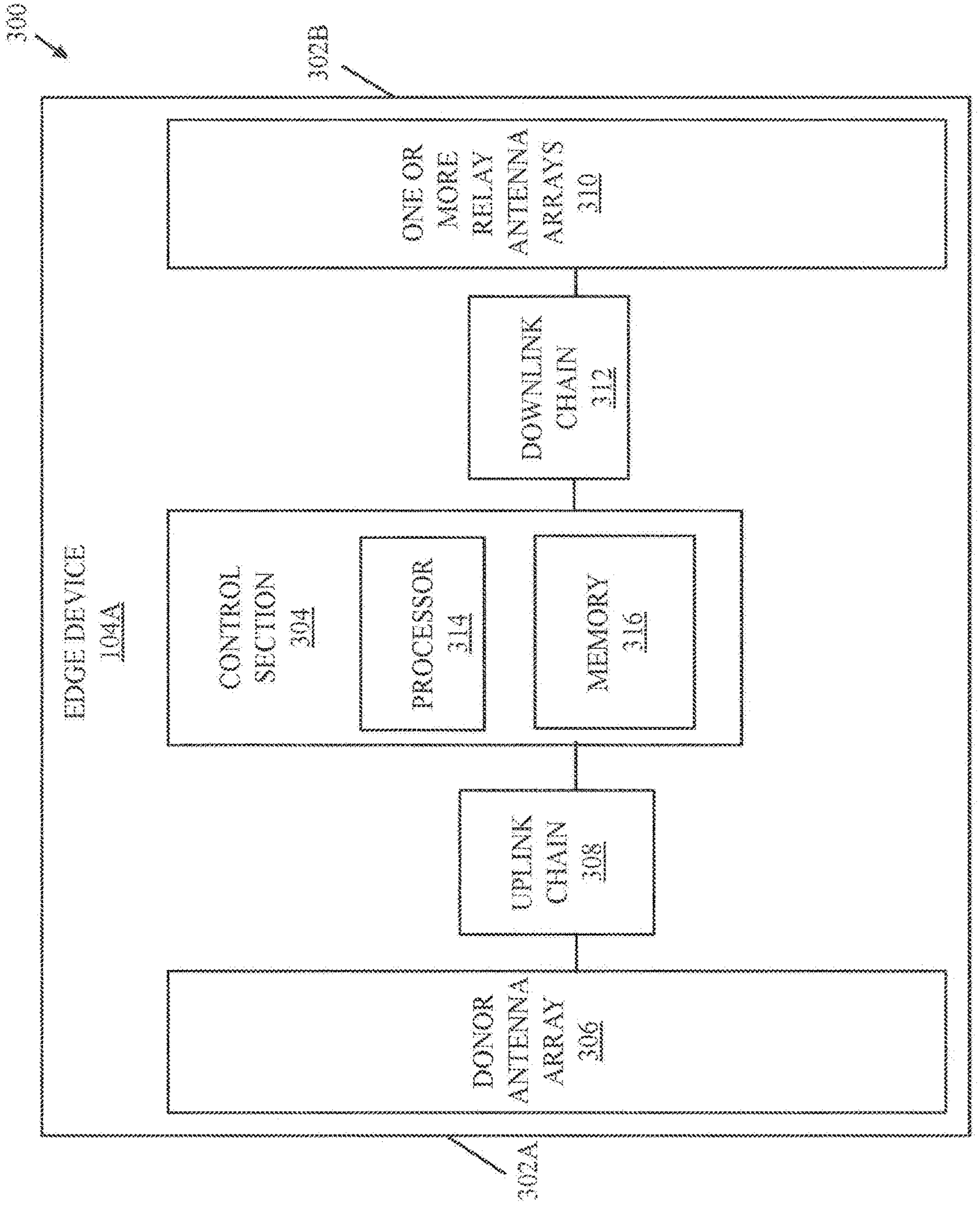
FIG. 3 is a block diagram illustrating different components of an exemplary edge device, in accordance with an embodiment of the disclosure.

FIG. 3 is a block diagram illustrating different components of an exemplary edge device, in accordance with an embodiment of the disclosure. FIG. 3 is explained in conjunction with elements from FIG. 1. With reference to FIG. 3, there is shown a block diagram 300 of the edge device 104A with various components. The edge device 104A is one of the plurality of edge devices 104 (FIG. 1). The edge device 104A has a donor side 302A facing towards the one or more RAN nodes 108, such as the first RAN node 108A (of FIG. 1). The edge device 104A also has a service side 302B facing towards the one or more UEs 106, such as the first UE 106A. In an implementation, the edge device 104A may include a control section 304 and a front-end radio frequency (RF) section, which may include the donor antenna array 306 and an uplink chain 308 at the donor side 302A, and further one or more service antenna arrays referred to as one or more relay antenna arrays 310 and a downlink chain 312 at the service side 302B. The control section 304 may be communicatively coupled to the front-end RF section, such as the one or more donor antenna arrays, such as the donor antenna array 306, the uplink chain 308, the one or more relay antenna arrays 310, and the downlink chain 312. The front-end RF section supports millimeter-wave (mmWave) communication as well communication at a sub 6 gigahertz (GHz) frequency. The control section 304 may further include processor 314 and a memory 316. In some implementation, the edge device 104A may further include a sensing radar and a radar data memory that are communicatively coupled to the processor 314 via a Serial Peripheral Interface (SPI) (not shown).

The edge device 104A includes suitable logic, circuitry, and interfaces that may be configured to communicate with the one or more RAN nodes 108 and the central cloud server 102. The edge device 104A may be further configured to communicate with the one or more UEs 106 and other edge devices of the plurality of edge devices 104. In accordance with an embodiment, the edge device 104A may support multiple and a wide range of frequency spectrum, for example, 3G, 4G, 5G, and 6G (including out-of-band frequencies). The edge device 104A may be at least one of an XG-enabled repeater device, an XG-enabled road-side unit (RSU), an XG-enabled relay device, an XG-enabled integrated CPE and repeater device, an XG-enabled vehicle-mounted edge device, where the term "XG" refers to 5G or 6G radio communication. Other examples of the edge device 104A may include, but is not limited to, a 5G wireless access point, an evolved-universal terrestrial radio access-new radio (NR) dual connectivity (EN-DC) device, a Multiple-input and multiple-output (MIMO)-capable repeater device, or a combination thereof deployed at a fixed location.

The donor antenna array 306 may be provided at the donor side 302A of the edge device 104A and may be coupled to an uplink chain 308. The one or more relay antenna arrays 310 may be provided at the service side 302B and may be coupled to the downlink chain 312. Each of the uplink chain 308 and the downlink chain 312 may include a transceiver chain, for example, a cascading receiver chain and a cascading transmitter chain, each of which comprises various components for baseband signal processing or digital signal processing. For example, the cascading receiver chain has various components, such as a set of low noise amplifiers (LNA), a set of receiver front end phase shifters, and a set of power combiners, for the signal reception (not shown here for brevity). Similarly, the cascading transmitter chain comprises various components for baseband signal processing or digital signal processing, such as a set of power dividers, a set of phase shifters, a set of power amplifiers (PA).

In an implementation, the one or more relay antenna arrays 310 at the service side 302B may be configured to execute mmWave communication with the one or more UEs 106 (including vehicles) within its communication range. In an implementation, the one or more relay antenna arrays 310 may also support multiple-input multiple-output (MIMO) operations and may be configured to execute MIMO communication with the one or more UEs 106 within its communication range. The MIMO communication may be executed at a sub 6 gigahertz (GHz) frequency or at mmWave frequency for 5G NR communication. Each of the donor antenna array 306 and the one or more relay antenna arrays 310 may be one of an XG phased-array antenna panel, an XG-enabled antenna chipset, an XG-enabled patch antenna array, or an XG-enabled servo-driven antenna array, where the "XG" refers to 5G or 6G. Examples of implementations of the XG phased-array antenna panel include, but are not limited to, a linear phased array antenna, a planar phased array antenna, a frequency scanning phased array antenna, a dynamic phased array antenna, and a passive phased array antenna.

The processor 314 may be communicatively coupled to the memory 316 and the front-end RF section. The processor 314 may be configured to execute various operations of the edge device 104A. The processor 314 may be configured to control various components of the front-end RF section, such as the donor antenna array 306 and the uplink chain 308 at the donor side 302A; and the one or more relay antenna arrays 310 and the downlink chain 312 at the service side 302B. The edge device 104A may be a programmable device, where the processor 314 may execute instructions stored in the memory 316. Examples of the implementation of the processor 314 may include but are not limited to an embedded processor, a baseband processor, a Field Programmable Gate Array (FPGA), a microcontroller, a specialized digital signal processor (DSP), a control chip, a Reduced Instruction Set Computing (RISC) processor, an Application-Specific Integrated Circuit (ASIC) processor, a Complex Instruction Set Computing (CISC) processor, and/or other processors, or state machines.

The memory 316 may be configured to store values calculated by the processor 314. Examples of the implementation of the memory 316 may include, but are not limited to, a random access memory (RAM), a dynamic random access memory (DRAM), a static random access memory (SRAM), a processor cache, a thyristor random access memory (T-RAM), a zero-capacitor random access memory (Z-RAM), a read-only memory (ROM), a hard disk drive (HDD), a secure digital (SD) card, a flash drive, cache memory, and/or other non-volatile memory. It is to be understood by a person having ordinary skill in the art that the control section 304 may further include one or more other components, such as an analog to digital converter (ADC), a digital to analog (DAC) converter, a cellular modem, and the like, known in the art, which are omitted for brevity.

In operation, the processor 314 of the edge device 104A may be configured to execute a discovery process (i.e., discovery operation). The discovery process may comprise determining location information of a plurality of neighboring nodes. The discovery process may further comprise identifying a donor beam index from amongst a plurality of beam indexes for the donor antenna array to establish a communication link to a first neighboring node of the plurality of neighboring nodes. The discovery process may further comprise identifying one or more relay beam indexes from amongst the plurality of beam indexes for the one or more relay antenna arrays to create one or more communication links to one or more second neighboring nodes of the plurality of neighboring nodes. The processor 324 may be further configured to communicate, via the donor antenna array 306, a first donor beam in a first radiation pattern based on the determined donor beam index and the location information of the first neighboring node (e.g., the edge device 104B) to establish the communication link to the first neighboring node. The processor 324 may be further configured to communicate, via the one or more relay antenna arrays 310, a first relay beam in a second radiation pattern and a second relay beam in a third radiation pattern to the one or more second neighboring nodes (e.g., the edge devices 104C and 104D) to establish one or more second communication links to the one or more second neighboring nodes.

In another aspect of the present disclosure, the processor 314 may be configured to initiate a discovery process at the edge device 104A. The processor 314 may be further configured to determine location information of a plurality of neighboring nodes around the edge device 104A. The plurality of neighboring nodes may comprise at least one of: the two or more neighboring edge devices of the plurality of edge devices 104 or a combination of the two or more neighboring edge devices and one or more RAN nodes 108 including the first RAN node 108A. The processor 314 may be further configured to determine (or sense) first beam measurement information for a plurality of first fired beams by the donor antenna array 306. The plurality of first fired beams are different beams fired in different directions and radiation patterns by the donor antenna array 306 by use of a plurality of different donor beam indexes stored at the edge device 104A. The processor 314 may be further configured to determine second beam measurement information for a plurality of second fired beams by the one or more relay antenna arrays 310. The plurality of second fired beams are different beams fired in different directions and radiation patterns by the one or more relay antenna arrays 310 by use of a plurality of different relay beam indexes stored at the edge device 104A.

The processor 314 may be further configured to communicate a plurality of sensed parameters 208 to the central cloud server 102 based on the discovery process. The plurality of sensed parameters 208 may be associated with the donor antenna array 306 and one or more relay antenna arrays 310. The plurality of sensed parameters 208 are assessed at the edge device 104A with respect to its corresponding two or more neighboring edge devices. In an implementation, the plurality of sensed parameters 208 may be communicated periodically to the central cloud server 102. The plurality of sensed parameters 208 may comprise the first beam measurement information for the plurality of first fired beams by the donor antenna array, the second beam measurement information for the plurality of second fired beams by the one or more relay antenna arrays 310, location coordinates of the edge device 104A, location coordinates of the plurality of neighboring nodes around the edge device 104A, and a unique identifier of the edge device 104A. In some implementation, the plurality of sensed parameters 208 may further comprise corresponding unique identifiers of the plurality of neighboring nodes around the edge device 104A along with their location coordinates. The processor 314 may be further configured to obtain a plurality of path setup parameters 210 specific for the edge device 104A from the central cloud server 102 in response to the communicated plurality of sensed parameters 208.

In accordance with an embodiment, the plurality of path setup parameters 210 determined specific for the edge device 104A may comprise the unique identifier of the edge device 104A, location coordinates of the corresponding two or more neighboring edge devices to be connected by the edge device 104A, a donor beam index to be selected for the donor antenna array 306, and one or more relay beam indexes to be selected for the one or more relay antenna arrays 310 of the edge device 104A. The processor 314 may be further configured to establish a communication link to a corresponding upstream neighboring node of the plurality of neighboring nodes based on the obtained plurality of path setup parameters 210, for example, based on the donor beam index selected for the donor antenna array 306 and location information of the corresponding upstream neighboring node. The processor 314 may be further configured to fire a beam of RF signal from the donor antenna array 306 in a specific direction indicated by the selected donor beam index towards its corresponding upstream neighboring node in order to establish the communication link to the corresponding upstream neighboring node.

The processor 314 may be further configured to fire one or more beams of RF signals in one or more specific directions indicated by the selected one or more relay beam indexes towards the one or more corresponding downstream neighboring nodes from the one or more relay antenna arrays 310 in order to establish the one or more communication links (e.g., two different communication links) with the one or more corresponding downstream neighboring nodes (e.g., two different downstream neighboring nodes). The processor 314 may be further configured to establish one or more communication links to one or more corresponding downstream neighboring nodes of the plurality of neighboring nodes based on the one or more relay beam indexes selected for the one or more relay antenna arrays 310 and the location information of each of the one or more corresponding downstream neighboring nodes. Alternatively, the processor 314 may be further configured to fire one or more beams of RF signals from the one or more relay antenna arrays 310 in one or more specific directions indicated by the identified one or more relay beam indexes towards the one or more corresponding downstream neighboring nodes in one or more radiation patterns depending on a corresponding distance of the edge device 104A from the one or more corresponding downstream neighboring nodes in order to establish the one or more communication links. The establishment of the communication link to the corresponding upstream neighboring node of the edge device 104A and further establishment of the one or more communication links (e.g., two communication links) to the one or more corresponding downstream neighboring nodes (e.g., at least two mesh nodes) may be used as a building block to create a mesh network 112 of the plurality of edge devices 104 such that a spatial coverage of at least a first RAN node 108A may be increased to serve one or more UEs 106 via the mesh network 112 with a throughput rate greater than a threshold. In other words, similar to the edge device 104A, other edge devices of the plurality of edge devices 104 may operate similarly to create the mesh network 112 of the plurality of edge devices 104 under the control of the central cloud server 102. In some implementation, the root mesh node that is connected to the first RAN node 108A may control other child mesh nodes (i.e., other edge devices of the plurality of edge devices 104) to form the mesh network 112 under the exclusive control of the root mesh node assisted by the central cloud server 102.

In accordance with an embodiment, one of plurality of edge devices 104 may be configured as a master mesh node, where the master mesh node may be configured to directly connect to a gNb and other slave mesh nodes under the control of the master mesh node form a self-organizing mesh network, such as a self-organising 5G mesh network. Since the master mesh node and all the slave mesh nodes may have cloud connectivity (i.e., connected to the central cloud server 102), election of beams of RF signals (i.e, 5G beams) to serve as a connection may be dynamic and may adapt to changing environment, such as a sudden signal blockage. In an implementation, these self-organizing mesh network connections may be driven autonomously at each edge devcie of the plurality of edge devices 104 without requiring cloud connectivity all the time, such as in a survivability mode. However, when a connectivity to the cloud, i.e., the central cloud server 102 is present, such mesh connections may be over-ridden from the central cloud server 102.

Figure 4:
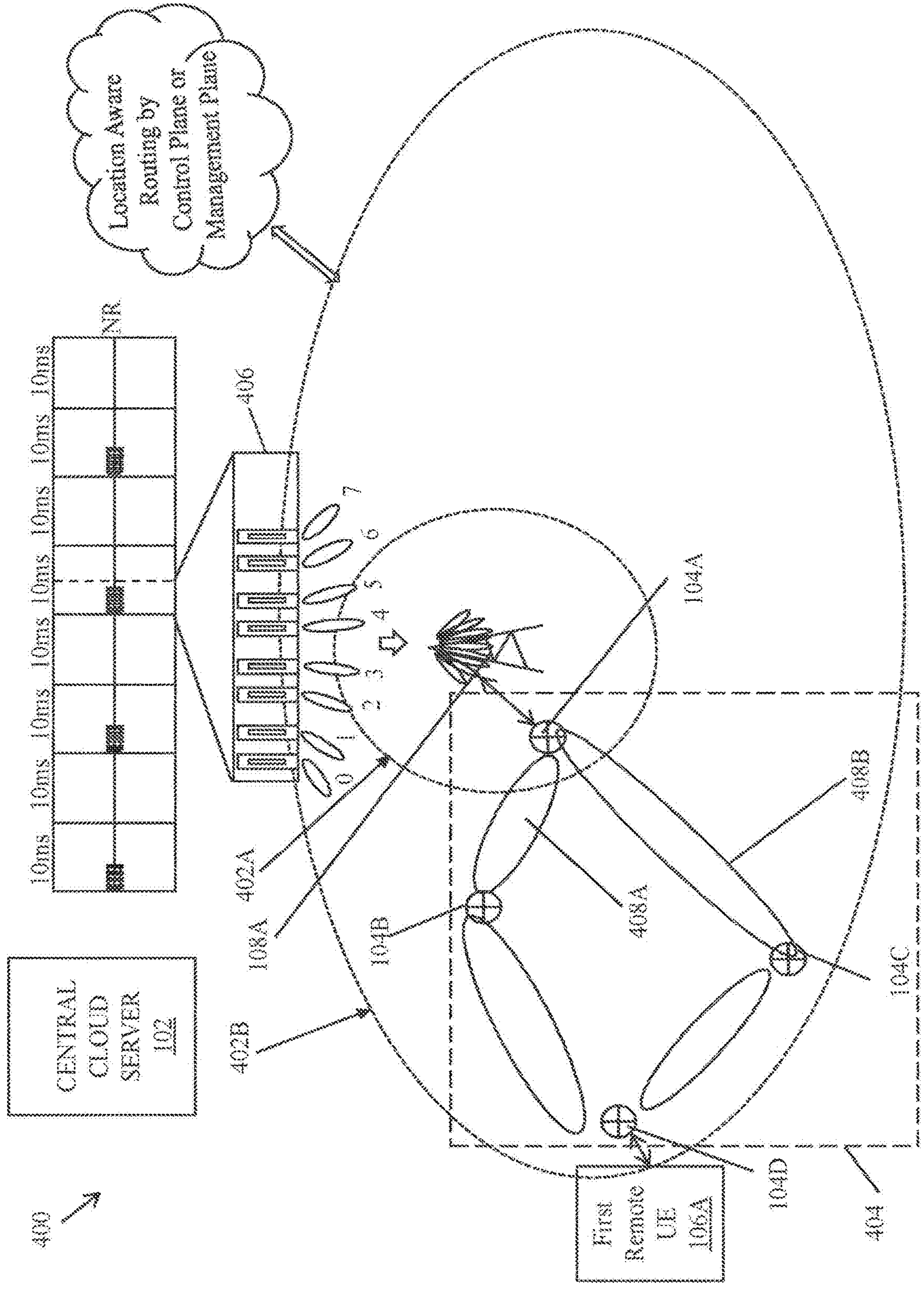
FIG. 4 is a diagram of an exemplary scenario for implementation of the communication system and method for operating a 5G mesh network for enhancing 5G cellular coverage to overcome signal blockage regions for ultra-reliable high-performance communication, in accordance with an embodiment of the disclosure.

FIG. 4 is a diagram of an exemplary scenario for implementation of the communication system and method for operating a 5G mesh network for enhancing 5G cellular coverage to overcome signal blockage regions for ultra-reliable high-performance communication, in accordance with an embodiment of the disclosure. FIG. 4 is explained in conjunction with elements from FIGS. 1 to 3. With reference to FIG. 4, there is shown an exemplary scenario 400 that includes the central cloud server 102 and the edge devices 104A, 104B, 104C, and 104D. In the exemplary scenario 400, there is further shown a first RAN node 108A (e.g., a small cell or a base station, such as a gNB) having an initial coverage 402A. The initial coverage 402A of the first RAN node 108A may be enhanced (i.e., an enhanced coverage 402B) using a plurality of edge devices, such as the edge devices 104A, 104B, 104C, and 104D, that forms the mesh network 404 (e.g., a 5G mesh network). There is further shown the first UE 106A communicatively coupled to the edge device 104D.

In the exemplary scenario 400, the processor 202 of the central cloud server 102 may be configured to cause each of the plurality of edge devices, such as the edge devices 104A, 104B, 104C, and 104D, to initiate a discovery process. Each edge device (i.e., each mesh node of the mesh network 404) of the edge devices 104A, 104B, 104C, and 104D may comprise one donor antenna array (such as the donor antenna array 306) and two relay antenna arrays (such as the one or more relay antenna arrays 310). In case of indoor deployment, each edge device may further include Wi-Fi capability, which may be used, for example, to determine its location coordinates or location coordinates of neighboring mesh nodes (e.g., nearby edge devices implemented as mesh nodes) by indoor received signal strength indication (RSSI)-based triangulation. In some implementation, each edge device may further include a position sensor or a location sensor (such as a gyroscope or a global positioning system (GPS) for outdoor localization (i.e., to determine its location coordinates).

In accordance with an embodiment, each edge device may be configured to execute the discovery process. In an implementation, the discovery process may be initiated based on an initiate command received from the central cloud server 102. The discovery process may also be referred to as a discovery protocol or a discovery operation. The discovery process comprises determining location information of a plurality of neighboring nodes. For example, the edge device 104C may determine its location and also the location of the neighboring nodes, such as other nearby edge devices 104A, 104B, and 104D. Such location coordinates determined via position or location sensor or via Wi-Fi-based triangulation may be communicated to the central cloud server 102. In an implementation, at the time of deployment of the edge devices 104A, 104B, 104C, and 104D, a location of such edge device may be uploaded to the central cloud server 102 along with an identity of the corresponding edge device. Location coordinates may be determined by any other known methods of location estimation, such as a triangulation method, using sounding waves, using sensors, Radar, BLUETOOTH™, RSSI from client etc. The discovery of the location of mesh nodes may be done by any methods known in the art.

In an implementation, the plurality of edge devices, such as edge devices 104A, 104B, 104C, and 104D, may be deployed strategically at different locations to increase coverage and overcome signal blockage so that a beam of RF signal can reach a location previously not reachable. For example, at nooks and corners of a building of an enterprise, behind a building, inside the building at different locations to overcome blockages and at least to create a line-of-sight path with two neighboring nodes. In an example, the plurality of edge devices, such as edge devices 104A, 104B, 104C, and 104D, may be deployed as a private mesh network created for an enterprise. Typically, inter distances among the plurality of edge devices (i.e., the mesh nodes) deployed indoors in an enterprise may be 60-90 meters or 70-80 meters. In another example, the plurality of edge devices, such as edge devices 104A, 104B, 104C, and 104D, may be deployed as a public network or a combination of public and private mesh networks for end-users.

In accordance with an embodiment, the discovery process may further comprise identifying a donor beam index from amongst a plurality of beam indexes for the donor antenna array (e.g., the donor antenna array 306) to establish a communication link to a first neighboring node of the plurality of neighboring nodes. Similarly, the discovery process may further comprise identifying one or more relay beam indexes from amongst the plurality of beam indexes for the two relay antenna arrays (e.g., the one or more relay antenna arrays 310) to create one or more communication links to one or more second neighboring nodes of the plurality of neighboring nodes.

In an example, a root mesh node, such as the edge device 104A, may be directly linked to the first RAN node 108A (e.g., a small cell or a gNB), as shown. In this case, in the exemplary scenario 400, there is further shown a signal synchronization Block (SSB) set transmission, which may be a time-domain transmission pattern of SSB in New radio (NR) 5G. Unlike in LTE, in the NR, there are many different cases of the Time Domain pattern of SSB Transmission. NR SSB may be transmitted in various different patterns depending on subcarrier spacing, frequency range, and some other parameters. A given SSB may be considered as a small package sitting in an NR radio frame, where each SSB may include a primary synchronization signal (PSS), a secondary synchronization signal (SSS), a Physical Broadcast Channel (PBCH), and a physical layer signal known as "DeModulation Reference Signal (DMRS)", which functions as a reference signal for decoding PBCH. All these components are allocated in an SSB resource grid as specified in the 3GPP specification for NR 5G. In the exemplary scenario 400, the first RAN node 108A may be a small cell that may implement beam sweeping by changing beam direction for each SSB transmission. It is to be understood that the number of different beams transmitted by the first RAN node 108A is determined by how many SSBs are being transmitted within an SSB Burst Set 406 (a set of SSBs being transmitted in 5 milliseconds (ms) window of SSB transmission). In this case, there are eight SSBs transmitted within the SSB burst set 406 indexed as 0-7. Alternatively stated, multiple SSBs may be transmitted with a certain interval, and each SSB can be identified by a unique number called SSB index (SSB index 0, 1, 2, 3, 4, 5, 6, and 7 as shown in this case). Moreover, each SSB is transmitted via a specific beam radiated in a certain direction by the first RAN node 108A (represented by beams in different directions) in an example. In other words, each SSB index may be mapped to each beam. The parameter that defines the maximum number of SSBs within an SSB set is called Lmax. In sub 6 GHz, Lmax is 4 or 8, and in mmWave, Lmax is 64. In other words, in sub 6 GHz, max 4 or 8 different beams can be used, and they sweep in one dimension (horizontal only or vertical only). In mmWave max, 64 different beams can be used, and they can sweep in two dimensions (horizontal and vertical directions).

In this case, the root mesh node, i.e., the edge device 104A, may be configured to measure the signal strength of each SSB it detected for a certain period (a period of one SSB Set) and may identify the SSB index with the strongest signal (e.g., the SSB A, for example, for SSB index 1 which corresponds to second beam-beam #1). Thus, the root mesh node, such as the edge device 104A, may be directly linked to the first RAN node 108A (e.g., a small cell or a gNB), as shown. Moreover, each edge device may include three radio interfaces (one donor antenna array and two relay antenna arrays). Thus, two communication links (or two communication paths) may be established from the two relay antenna arrays. Similarly, one communication link (or one communication path) may be created from the donor side for upstream communication. In the edge device 104A, which beam to activate from the two relays (i.e., the two relay antenna arrays) may not be known yet. This needs to be discovered in the discovery process. In other words, it may be required to discover which beam index to select for an appropriate communication link (or path). So, there is an initial discovery process in which two relay beam indexes (e.g., beam index #43 and beam index #51) may be identified from amongst the plurality of beam indexes (e.g., 0-57 beam indexes; 0-63 beam indexes etc.) for the one or more relay antenna arrays to create two communication links 408A and 408B to two second neighboring nodes (i.e., the edge devices 104B and 104C) of the plurality of neighboring nodes.

Figure 5:
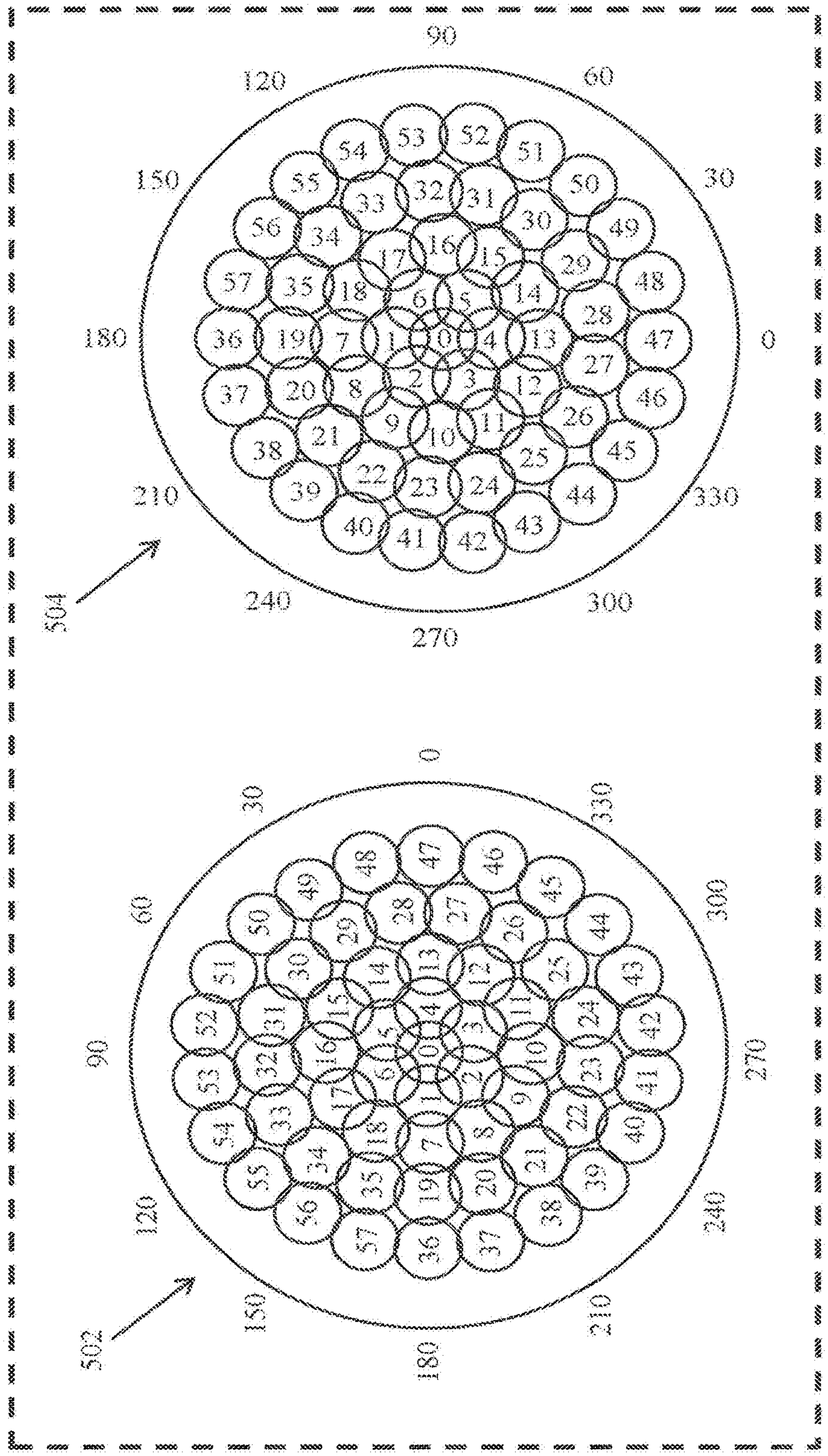
FIG. 5 is a diagram that illustrates beam indexes in a gum-stick representation, in accordance with an embodiment of the disclosure.

FIG. 5 is a diagram that illustrates beam indexes in a gum-stick representation, in accordance with an embodiment of the disclosure. FIG. 5 is explained in conjunction with elements from FIGS. 1 to 4. With reference to FIG. 5, there is shown a first plurality of beam indexes arranged in a vertical direction depicted by a first gum-stick representation 502. There is also shown a second plurality of beam indexes arranged in a horizontal direction (horizontal with respect to the surface of ground plane) depicted by a second gum-stick representation 504. When the gum-sticks are placed vertically, those gum-sticks represent a beam book index (like the first gum-stick representation 502). At each edge device of the plurality of edge devices 104, such as the edge devices 104A, 104B, 104C, and 104D, the typical beam book index may be rotated 90 degrees to obtain the arrangement of beam indexes as shown, for example, in the second plurality of beam indexes arranged in a horizontal direction (e.g., like the second gum-stick representation 504). Such beam indexes (i.e., gum-sticks) are mapped horizontally at the donor antenna array 306 and the two relays, i.e., the one or more relay antenna arrays 310. Typically, by default, a boresight beam (index 0 in the middle) may be selected, but in the present disclosure, the selection of the beam index is based on the location information (i.e., location coordinates) of the next mesh point, i.e., neighboring edge device. Thus, based on such identification of the best-suited beam indexes, the edge device 104A may be configured to select and fire two beams with beam index #43 and beam index #53 in two different directions specifically towards the edge device 104B and 104C, which ends up creating connections, i.e., two communication links 408A and 408B (shown in FIG. 4). This is further explained, for example, in FIG. 6.

Figure 6:
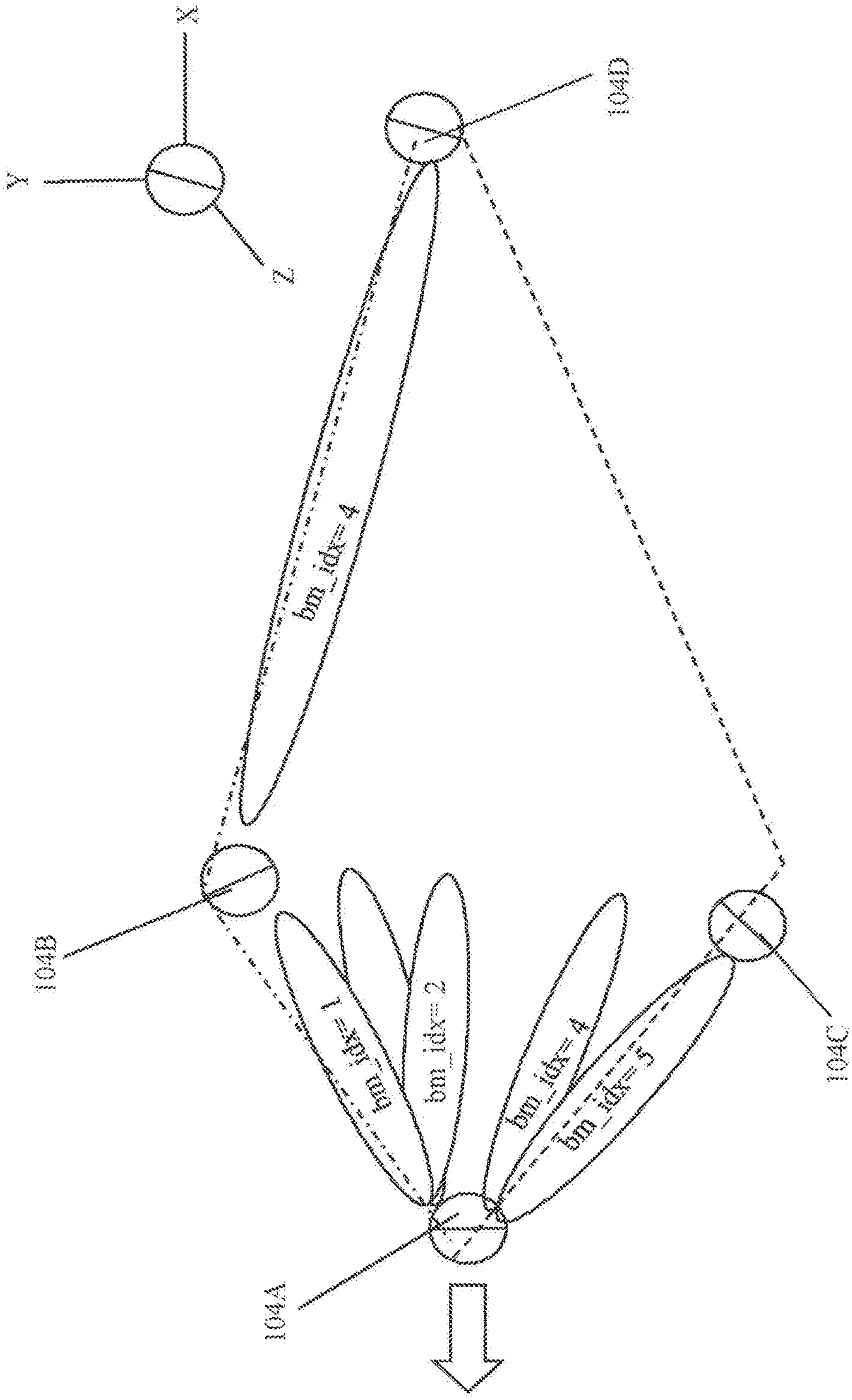
FIG. 6 is a diagram that illustrates beam mapping and path learning by the central cloud sever, in accordance with an embodiment of the disclosure.

FIG. 6 is a diagram that illustrates beam mapping and path learning by the central cloud sever, in accordance with an embodiment of the disclosure. FIG. 6 is explained in conjunction with elements from FIGS. 1 to 5. With reference to FIG. 6, there is shown an exemplary mesh network of four mesh nodes, such as the edge devices 104A, 104B, 104C, and 104D, to explain the beam mapping and path learning in the initial discovery process. As it is to be discovered which beam index to select for appropriate communication link (or communication path), each relay antenna array of the two relay antenna arrays (i.e., the one or more relay antenna arrays 310) may be configured to fire a plurality of different beams by selecting different beam indexes, for example, beam indexes represented by gum-sticks in the second gum-stick representation 504 (FIG. 5) and measure the Equivalent Isotropic Radiated Power (EIRP) or RSSI of each fired beam. It is observed that there is almost 6 decibels (dB) difference (or drop) between two extremes, such as beam indexes #43 and #51. It is further observed that a 6 dB difference is enough to substantially increase or decrease the data throughput rate. In some cases, it was observed that the throughput increased from 1 GB to 2.4 GB by a selection of appropriate beam index. Thus, it is initially identified which are the right beams indexes to be selected, and it may be determined by finding a heading vector. For example, say using two determined location coordinates of two mesh nodes, the heading vector may be found. However, the firing of beams and collecting of measurement data (e.g., EIRP, RSSI, etc.), may still be executed in the backend. This backend scanning may be executed as there may be some reflective objects or reflective paths at some locations or due to dynamic nature of the environment, one of the previously identified beam index and corresponding beam may become weaker or some other beams may become stronger. Thus, a periodic discovery is performed at each edge device (i.e., each mesh node) to cater to such change in reflective paths. Such path(s) may be kept ready as backup or alternative paths, which may be fallback options. In other words, when a primary path is broken, a secondary path is activated. By use of the discovery process, each edge device may be configured to exchange information with the central cloud server 102.

In an implementation, a link state protocol, such as an Open Shortest Path First (OSPF) algorithm, may be used, which runs on each edge device of the edge devices 104A, 104B, 104C, and 104D (i.e., each mesh node of the mesh network 404) and sends such information to the central cloud server 102. Alternatively stated, the central cloud server 102 may be configured to obtain a plurality of sensed parameters 208 from each edge device of the plurality of edge devices 104, such as the edge devices 104A, 104B, 104C, and 104D, based on the discovery process at each edge device of the plurality of edge devices. Such plurality of sensed parameters 208 are associated with the donor antenna array (e.g., beam measurements for fired beams for different beam indexes at the donor antenna array 306) and the one or more relay antenna arrays 310 (e.g., beam measurements for fired beams for different beam indexes at the two relays) of each edge device. The plurality of sensed parameters 208 may be assessed at each edge device with respect to its corresponding two or more neighboring network nodes. The plurality of sensed parameters 208 may comprise its location coordinates and measurement data. Further, as beam adjustments are taking place on a periodic basis and backend processing runs periodically, the plurality of sensed parameters 208 may be periodically obtained from the plurality of edge devices 104, such as the edge devices 104A, 104B, 104C, and 104D.

The central cloud server 102 may be further configured to determine a plurality of path setup parameters 210 specific for each edge device of the plurality of edge devices 104 based on the obtained plurality of sensed parameters 208 from each edge device of the plurality of edge devices 104. The path setup parameters may be stored in reachability tables 212 for upstream and downstream communication. An example of the reachability tables 212 is shown and described, for example, in FIG. 7. The central cloud server 102 may be further configured to communicate the plurality of path setup parameters 210 determined specifically for each edge device, to each corresponding edge device of the plurality of edge devices 104. Based on the communicated plurality of path setup parameters 210 to each corresponding edge device of the plurality of edge devices 104, the central cloud server 102 may be further configured to cause the plurality of edge devices 104 to form the mesh network 404 such that a spatial coverage (e.g., the initial coverage 402A) of at least a RAN node, such as the first RAN node 108A, may is increased to serve one or more UEs, such as the first UE 106A (previously unreachable due to signal blockage), which are stationary or in motion via the mesh network 404 with a throughput rate greater than a threshold, for example, in a multi-gigabit throughput rate. The parameters that define a communication link (such as the communication links 408A and 408B) may be <relay number, location coordinates (e.g., IMU—Gyroscope/GPS-xyz coordinates), near end relay beam book IDx, far end donor beam IDx>, where relay_set_beambook_index (int bm_idx), i.e., beam indexes that are identified at most suited for each edge device during the discovery process are set at the corresponding edge device. Each edge device, for example, a first edge device (i.e., the edge device 104A) may be configured to communicate, via the donor antenna array 306, a first donor beam in a first radiation pattern based on the determined donor beam index and the location information of the first neighboring node (e.g., the first RAN node 108A or a neighboring mesh node) to establish the communication link to the first neighboring node. Each edge device, for example, a first edge device (i.e., the edge device 104A) may be further configured to communicate, via the one or more relay antenna arrays 310, a first relay beam in a second radiation pattern and a second relay beam in a third radiation pattern to the one or more second neighboring nodes (e.g., the edge devices 104B and 104C) to establish one or more second communication links (e.g., the communication links 408A and 408B) to the one or more second neighboring nodes (e.g., the edge devices 104B and 104C).

FIG. 7 is a diagram that illustrates reachability tables for upstream and downstream communication generated by the central cloud server, in accordance with an embodiment of the disclosure. FIG. 7 is explained in conjunction with elements from FIGS. 1 to 6. With reference to FIG. 7, there is shown a first reachability table 702 for downstream and a second reachability table 704 for upstream. Based on the obtained plurality of sensed parameters 208 from each edge device of the plurality of edge devices 104, the central cloud server 102 may be further configured to determine the plurality of path setup parameters 210 specific for each edge device of the plurality of edge devices 104 and store such path set parameters as a corresponding path tags, simply referred to as tags, in the reachability tables (e.g., the first reachability table 702 for downstream and the second reachability table 704 for upstream), where each tag defines a communication link and one or multiple communication links together may establish a communication path (i.e., a route or a communication path taken from a source node (e.g., the first RAN node 108A) to reach a destination node (e.g., the first UE 106A) and vice versa via the mesh network 404). Each tag comprises path set up parameters defined in a given corresponding row. For example, "tag-d1" may comprise one path setup parameters corresponding to relay 1 (e.g., one edge device).

In this case, the downstream may refer to what a given edge device may be looking to relay down to its next mesh point (i.e., neighboring edge device or neighboring node). The upstream may be defined from a perspective of communication from the donor side of each edge device (i.e., towards its upstream neighboring node). In some implementation, unlike the use of the radio parameters as one of the path setup parameters for the upstream, such radio parameters may not be considered in the downstream is because each edge device simply inherits and relays whatever radio parameters are present on the donor side of each edge device. For example, radio parameters of the donor antenna array may be automatically inherited, meaning if the frequency of 28 GHz or 39 GHz, or sync path gain parameter are applied to the donor side (i.e., at the donor antenna array), and once these radio parameters are established, then the relay side doesn't need to carry that extra data of radio parameters on the downstream side of each edge device, as it may be simply inherited or replicated at the two relays (i.e., the one or more relay antenna arrays 310). In some alternative implementations, each edge device may not inherit and relay whatever radio parameters are present on the donor side of each edge device. For example, a frequency (F1) received at the donor side may be upconverted or down-converted to a different frequency (F2) as per the need for ultra-reliable high-performance communication.

In an implementation, each edge device (i.e., mesh node) may be configured to update the central cloud server 102, for example, via a "Hello" protocol to update the reachability tables, such as the first reachability table 702 for downstream and the second reachability table 704 for upstream. Each edge device (i.e., mesh node) may look for a "hello" protocol which may be mapped to OSPF. As described in FIG. 6, a link-state protocol, such as the OSPF algorithm, may be used, which runs on each edge device (i.e., each mesh node of the mesh network 404) and periodically sends information, such as <relay ID>, <location coordinates>, for example, information of upstream and downstream neighboring nodes, <donor beam index>, relay beam index, any change in beam information or beam indexes, to the central cloud server 102. The central cloud server 102 may be configured to determine spatially where the mesh points are (i.e., location of edge devices with respect to each other spatially in a geographical area), determines path setup parameters and complete end-to-end communication paths between source and destination nodes and dynamically connects some mesh nodes that act as intermediate nodes between the source and destination nodes to facilitate upstream and downstream communication between such source (e.g., the first RAN node 108A) and destination nodes (e.g., the first UE 106A).

In accordance with an embodiment, the central cloud server 102 may be further configured to determine a primary communication path between the first RAN node 108A and one or more UEs 106 (e.g., the first UE 106A) via a first set of edge devices (e.g., the edge devices 104A, 104B, and 104D) of the plurality of edge devices 104, where each edge device of the plurality of edge devices 104 is configured as a mesh node of the mesh network 404. Similarly, the central cloud server 102 may be further configured to determine one or more secondary communication paths between the first RAN node 108A and the one or more UEs 106 via a second set of edge devices (e.g., the edge devices 104A, 104C, and 104D) of the plurality of edge devices. The central cloud server 102 may be further configured to cause the first set of edge devices (e.g., the edge devices 104A, 104B, and 104D) to establish the determined primary communication path to service the one or more UEs 106 (e.g., the first UE 106A) for uplink and downlink communication. The primary communication path may be established based on the communicated path setup parameters specific to each of the first set of edge devices (e.g., the edge devices 104A, 104B, and 104D). A beam routing controller (e.g., the processor 202) of the central cloud server 102 may send the path setup parameters to each mesh point, such as the first set of edge devices (e.g., the edge devices 104A, 104B, and 104D).

However, in case of a signal blockage due to obstructions or movement of the first UE 106A or any other change in the environment (e.g., a repeater device or the first UE 106A being served changed its position), the central cloud server 102 may be further configured to dynamically switch from the primary communication path to the determined one or more secondary communication paths within a threshold time (e.g., less than 100 milliseconds) based on a presence of a signal obstruction in the primary communication path to maintain continuity in the service to the one or more UEs 106 for the uplink and downlink communication. The signal blockage or the presence of a signal obstruction in the primary communication path may be known to the central cloud server 102 based on the periodic information received from at least each of the participating edge devices, i.e., the first set of edge devices (e.g., the edge devices 104A, 104B, and 104D) that are used to form the primary communication path. Thus, the primary communication path may be made dormant, and the secondary communication path may be made active. The path recovery may be autonomously triggered locally at the concerned edge device (e.g., the edge device 104B) or may be directed from the central cloud server 102. In an implementation, the switching event may be executed via a management plane of the mesh network 404, where the switching event may be controlled by the central cloud server 102.

Figure 8A:
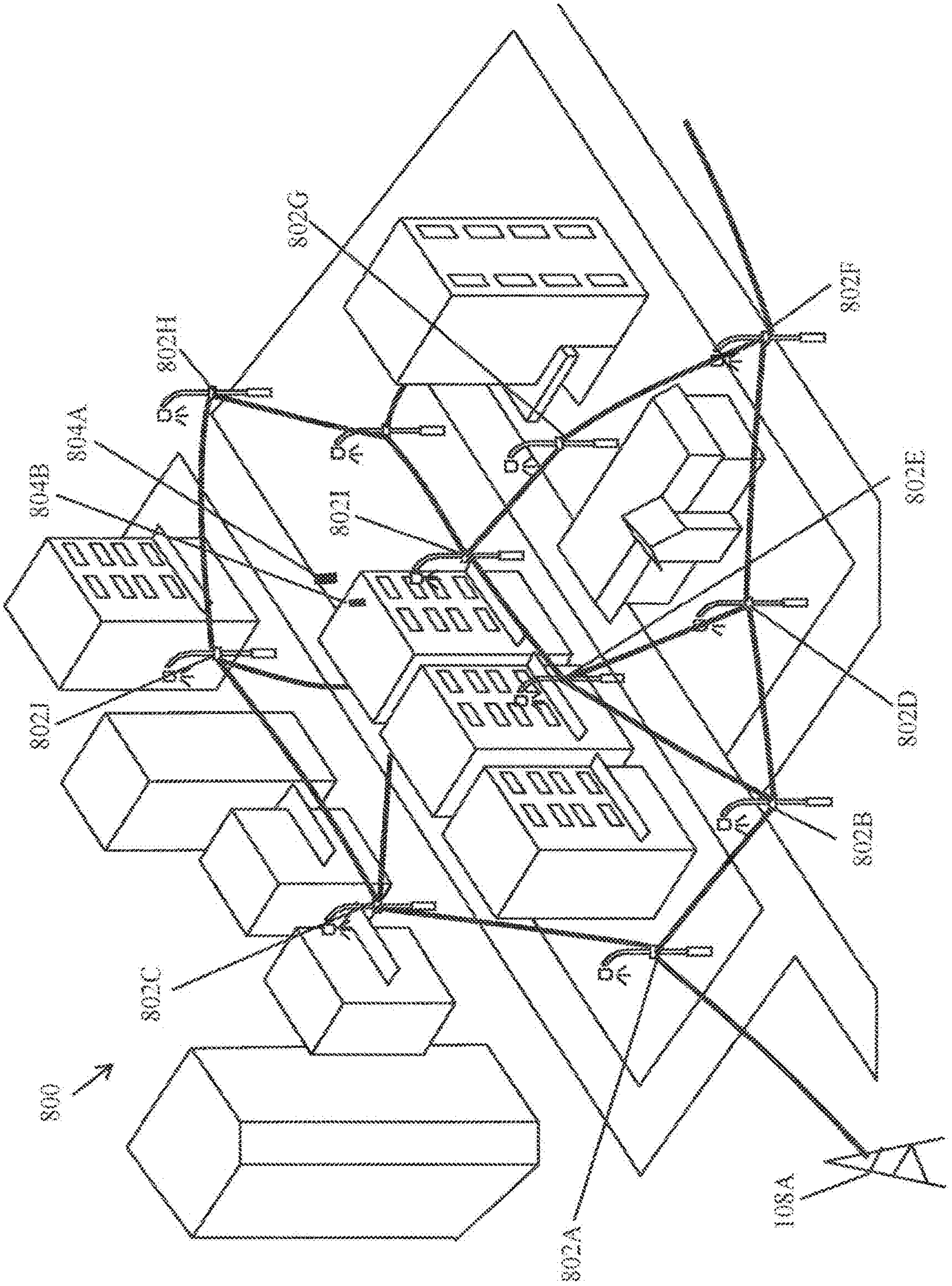
FIG. 8A is a diagram illustrating an exemplary scenario of a mesh network with an exemplary distribution of mesh nodes to overcome signal blockage to enhance 5G coverage for ultra-reliable high-performance communication, in accordance with an embodiment of the disclosure.

FIG. 8A is a diagram illustrating an exemplary scenario of a mesh network with distribution of mesh nodes to overcome signal blockage to enhance 5G coverage for ultra-reliable high-performance communication, in accordance with an embodiment of the disclosure. FIG. 8A is explained in conjunction with elements from FIGS. 1 to 7. With reference to FIG. 8A, there is shown a mesh network 800A of a plurality of edge devices 104 that includes a root mesh node 802A and a set of child mesh nodes 802B to 802J. There is further shown the root mesh node 802A linked to the first RAN node 108A.

In an exemplary implementation, existing fiber network may be replaced by the mesh network 800A, for example, a 60 GHz Mesh network or a mesh network operating at other mmWave frequencies to enhance the 5G cellular coverage of a RAN node, such as the first RAN node 108A, for ultra-reliable high-performance communication and high throughput, such as 3-20 Gbps throughput, with flexibility of fronthaul and backhaul networks, supporting both outdoor units (i.e., edge devices deployed outdoors) and indoor units (edge devices deployed indoors within buildings) and IP transport implementations for 4G and 5G cellular networks. For example, the first UE 804A may be unreachable by the first RAN node 108A due to signal blockage by the intermittent buildings. The mesh network 800A may be dynamically formed based on the communicated plurality of path setup parameters by the central cloud server 102 to each of the plurality of edge devices, such as the root mesh node 802A and the set of child mesh nodes 802B to 802J. A specific set of edge devices may be selected to form a communication path (i.e., a route) so that an uplink as well as downlink communication is established between the first RAN node 108A and the first UE 804A via the mesh network 800A using the selected specific set of edge devices, for example, the root mesh node 802A and the child mesh nodes 802C and 802J in an example. Alternatively, any other communication path may be dynamically set up by the central cloud server 102 when any change in signal strength of communication links of the participating mesh nodes is detected or when any change in terms of signal strength at the first UE 804A being serviced is detected when such change is predicted to influence the QoE by the first UE 804A being serviced (e.g., broken links, any change in environment, any change with respect to the signal obstructing objects or signal attenuation due to the movement of the first UE 804A). Similarly, the second UE 804B may be located within a building (indoors), where a similar arrangement of edge devices may be deployed, which may be a part of the mesh network 800A. Thus, whether it is a public network, or a private network created for an enterprise within a building a group of buildings, the mesh network 800A significantly improves 5G coverage of the first RAN node 108A (e.g., a 5G enabled small cell or a gNB), overcomes signal blockage regions by use of the mesh network 800A (e.g., a 5G mesh network in this case) formed dynamically by the plurality of edge devices under the control of the central cloud server 102 of the communication system 100 and enhances the QoE. Thus, the communication system 100 that generates the mesh network 800A further significantly improves performance in terms of data throughput and signal-to-noise ratio (SNR) of one or more end-user devices, such as the first UE 804A and the second UE 804B, while ensuring seamless connectivity when employed in indoors, outdoors, or a combination thereof.

In an exemplary implementation, one or more "path tags" (or simply referred to as tags) may be inserted/removed by each edge device of the plurality of edge devices, for example, the root mesh node 802A and the child mesh nodes 802C and 802J. In an implementations, the path tags may be used at the beginning of a frame to determine its routed path across the mesh network 800A. This may help to achieve a reduction in latency and may have relevance to emerging Integrated Access and Backhaul (IABs) units that are being designed to extend small cells as the formation and use of the mesh network 800A of the present disclosure may provide better 5G (even suited for 6G) cellular coverage and multi-protocol aware RF communication, which may be leveraged to improve performance and reduce cost.

Figure 8B:
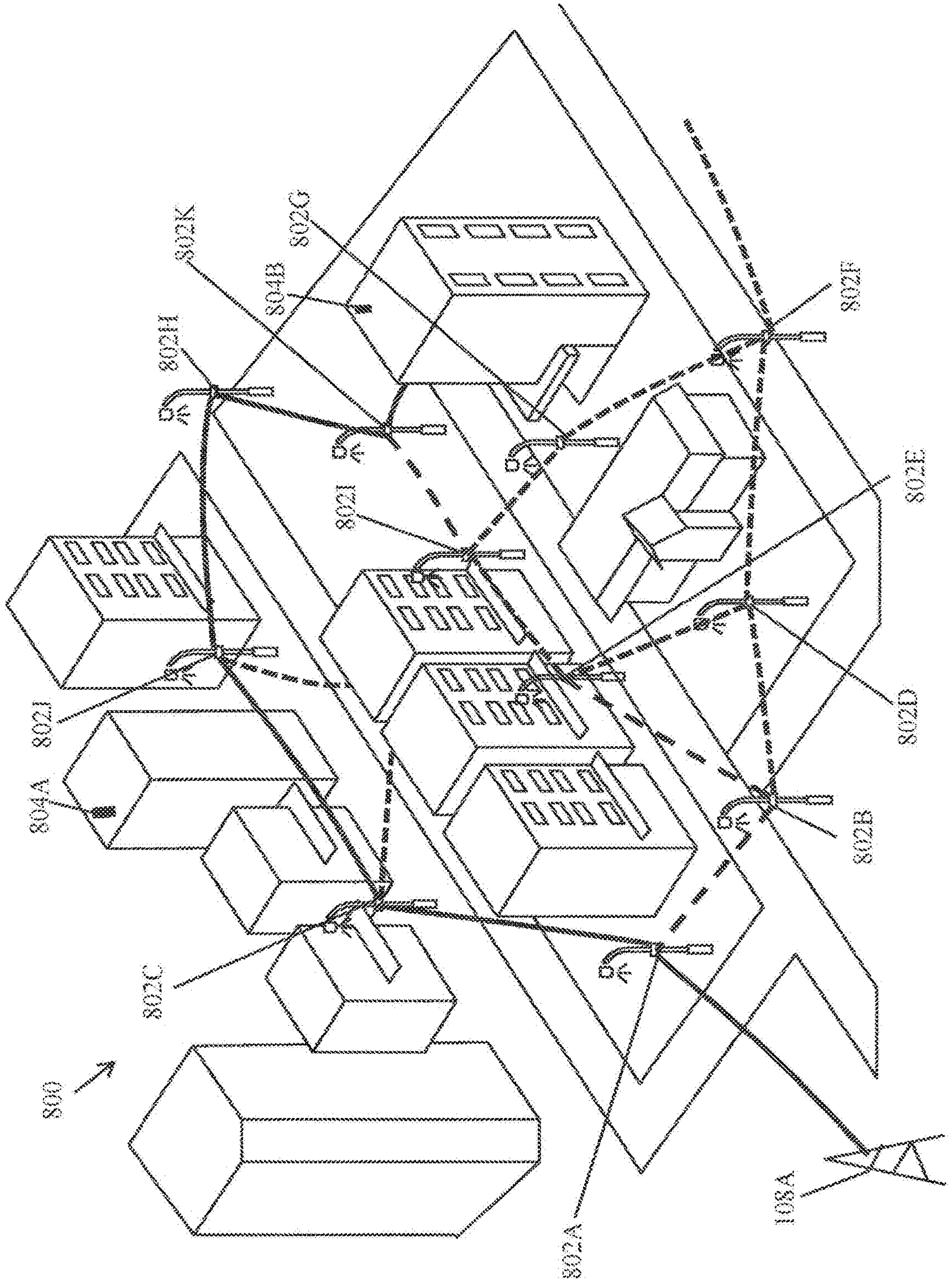
FIG. 8B is a diagram illustrating an exemplary scenario of a mesh network with an exemplary distribution of mesh nodes to overcome signal blockage to enhance 5G coverage for ultra-reliable high-performance communication, in accordance with another embodiment of the disclosure.

FIG. 8B is a diagram illustrating an exemplary scenario of a mesh network with distribution of mesh nodes to overcome signal blockage to enhance 5G coverage for ultra-reliable high-performance communication, in accordance with an embodiment of the disclosure. FIG. 8B is explained in conjunction with elements from FIGS. 1 to 7, and 8A. With reference to FIG. 8B, there is shown a mesh network 800B of the plurality of edge devices 104 that includes the root mesh node 802A and the set of child mesh nodes 802B to 802J. There is further shown the root mesh node 802A linked to the first RAN node 108A.

In an implementation, the processor 202 may be configured to determine the primary communication path between the first RAN node 108A and the first UE 804A via the root mesh node 802A and the child mesh nodes 802C and 802J in an example. Thereafter, the processor 202 may be configured to cause the root mesh node 802A and the child mesh nodes 802C and 802J to establish the primary communication path to service the first UE 804A for uplink and downlink communication, as shown by bold lines in FIG. 8B. Moreover, the processor 202 may further be configured to determine the secondary communication path between the first RAN node 108A and the first UE 804A via the root mesh node 802A and the child mesh node 802C. In an implementation, the processor 202 may be further configured to determine a plurality of secondary communication paths between the first RAN node 108A and the first UE 804A via different sets of mesh nodes (e.g., via the child mesh nodes where the communication path may start from the first RAN node 108A to the root mesh node 802A, and then to the child mesh nodes 802B, 802E, 802I, 802K, and 802J in a bidirectional communication sequence) based on the location of the first UE 804A. The processor 202 of the central cloud server 102 may further be configured to control switching from the primary communication path to the determined secondary communication path within a threshold time based on a presence of a signal obstruction in the primary communication path to maintain the continuity in the service to the first UE 804A for the uplink and downlink communication. The signal obstruction may be present due to the obstructions or movement of the first UE 804A, as further shown and described in FIG. 8C, due to which the uplink communication and the downlink communication of the first UE 804A may be affected. In an implementation, the control of the switching from the primary communication path to the secondary communication path includes gradually decreasing the gain of the primary communication path until the primary communication path becomes dormant. In addition, the control of the switching from the primary communication path to the determined secondary communication path further includes concomitantly and gradually increasing the gain of the secondary communication path until the secondary communication path becomes a new active path. Therefore, the processor 202 may enhance the coverage of the RAN node, such as the first RAN node 108A and maintain connectivity by dynamically switching the communication paths to overcome signal blockage regions within a building (i.e., indoors) as well as outside a building (i.e., outdoors) for ultra-reliable communication.

In another implementation, the processor 202 may be configured to determine the primary communication path between the first RAN node 108A and the second UE 804B via the root mesh node 802A and the child mesh nodes 802C, 802J, 802H, and 802K to service another UE, such as the second UE 804B, in an example. Thereafter, the processor 202 may be configured to cause the root mesh node 802A and the child mesh nodes 802C, 802J, 802H, and 802K to establish the primary communication path to service the second UE 804B for uplink and downlink communication. Moreover, the processor 202 may further be configured to determine the secondary communication path between the first RAN node 108A and the second UE 804B via the root mesh node 802A and the child mesh nodes 802B, 802E, 802I, and 802K. In an implementation, the processor 202 may be further configured to determine a plurality of secondary communication paths between the first RAN node 108A and the second UE 804B via different sets of mesh nodes (e.g., via the child mesh node 802B, 802D, 802F, and 802G) based on the location of the second UE 804B. The processor 202 of the central cloud server 102 may further be configured to control switching from the primary communication path to the determined secondary communication path within a threshold time based on a presence of a signal obstruction in the primary communication path to maintain the continuity in the service to the second UE 804B for the uplink and downlink communication. In an implementation, the signal obstruction may be present due to the obstructions or movement of the second UE 804, as further shown and described in FIG. 8C, due to which the uplink communication and the downlink communication of the second UE 804B may be affected.

The processor 202 is configured to maintain continuity in the service to the first UE 804A and the second UE 804B for the uplink and downlink communication. Such as, the processor 202 is configured to switch from the primary communication path to the secondary communication paths within the threshold time (e.g., less than 100-150 milliseconds) based on the presence of the signal obstruction in the primary communication path. Thus, the primary communication path may be made dormant, and the secondary communication path may be made active. In one example, in case of signal blockage, even an instruction may be sent in advance to each participating edge device of the primary communication path, to autonomously trigger the switching to the second communication path as it is preloaded with tags corresponding to one or more alternative paths. In another example, the central cloud server 102 may be configured to trigger such switching events based on the periodic information received by each of the plurality of edge devices via the OSBF. In some cases, the signaling may be done via an LTE channel although not frequently to minimize network load. In other words, on attachment failure via the primary communication path, alternate path setup parameters are issued by the central cloud server 102. The path recovery may be autonomously triggered locally at the concerned edge device (e.g., the edge device 104B) or may be directed from the central cloud server 102. In an implementation, the switching event may be executed via a management plane of the mesh network 800B, where the switching event may be controlled by the central cloud server 102.

Figure 8C:
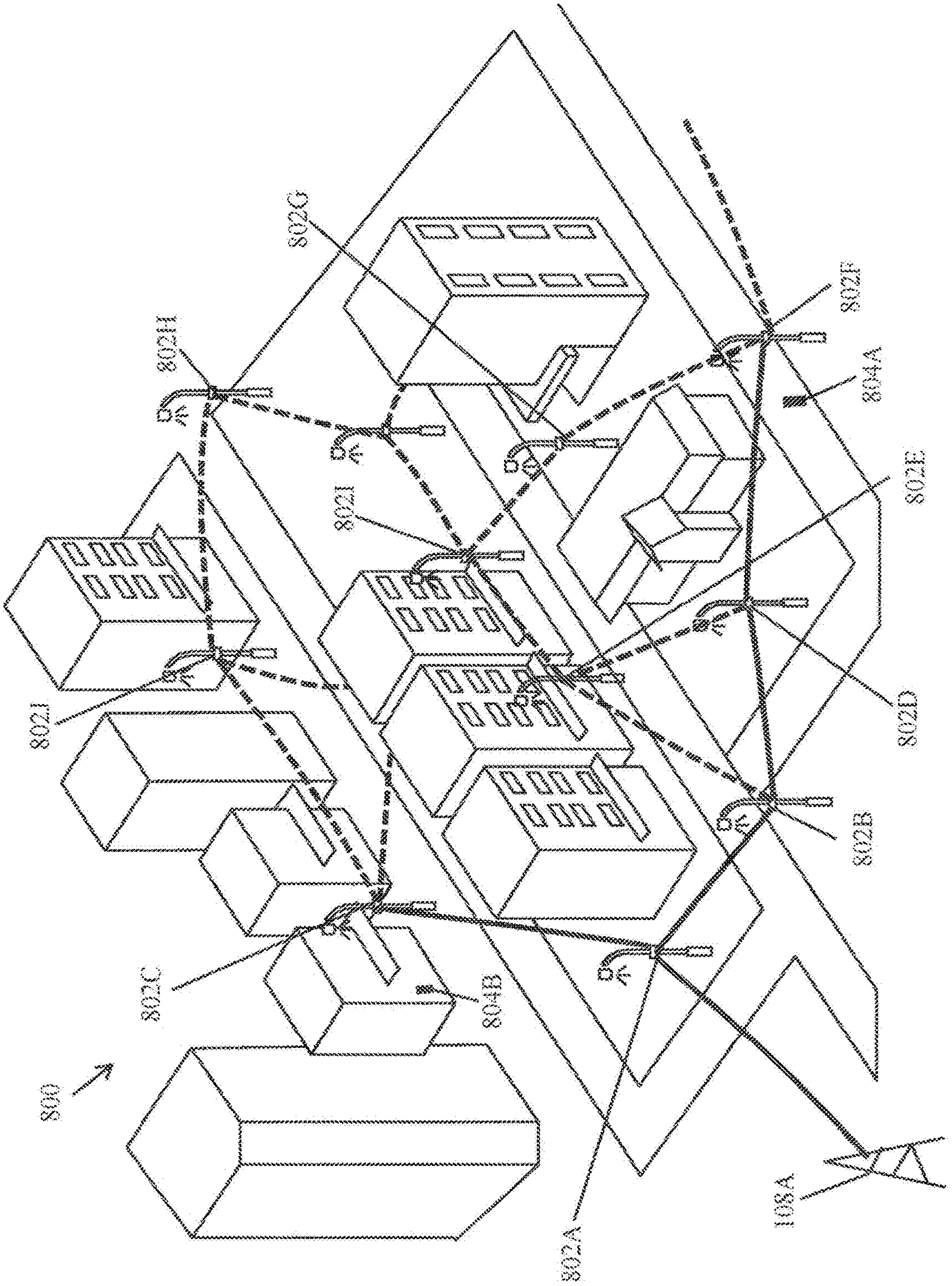
FIG. 8C is a diagram illustrating an exemplary scenario of a mesh network with an exemplary distribution of mesh nodes to overcome signal blockage to enhance 5G coverage for ultra-reliable high-performance communication, in accordance with yet another embodiment of the disclosure.

FIG. 8C is a diagram illustrating an exemplary scenario of a mesh network with distribution of mesh nodes to overcome signal blockage to enhance 5G coverage for ultra-reliable high-performance communication, in accordance with an embodiment of the disclosure. FIG. 8C is explained in conjunction with elements from FIGS. 1 to 7 and 8B. With reference to FIG. 8C, there is shown a mesh network 800C of a plurality of edge devices 104 that includes the root mesh node 802A and the set of child mesh nodes 802B to 802J. There is further shown the root mesh node 802A linked to the first RAN node 108A.

In this scenario, the location of the first UE 804A and the second UE 804B is changed, due to the movement of the first UE 804A and the second UE 804 and signal obstruction may be present that may interrupt direct communication with the first RAN node 108A. Thereafter, the processor 202 may be configured to control switching from the primary communication path to the determined secondary communication path within a threshold time to maintain the continuity in the service to the first UE 804A and the second UE 804 for the uplink and downlink communication. As a result, the primary communication path becomes dormant and the secondary communication path becomes a new active path, as shown in FIG. 8C. For example, the new active path or the secondary communication path between the first RAN node 108A and the first UE 804A includes the root mesh node 802A and the child mesh node 802C. In an implementation, the new active path between the first RAN node 108A and the first UE 804A may include another secondary communication path from the plurality of secondary communication paths based on the rank of each of the plurality of secondary communication paths. Similarly, the new active path or the secondary communication path between the first RAN node 108A and the second UE 804B includes the root mesh node 802A and the child mesh nodes 802B, 802D, and 802F. In an implementation, the new active path between the first RAN node 108A and the second UE 804B may include another secondary communication path from the plurality of secondary communication paths based on the rank of each of the plurality of secondary communication paths.

Figure 8D:
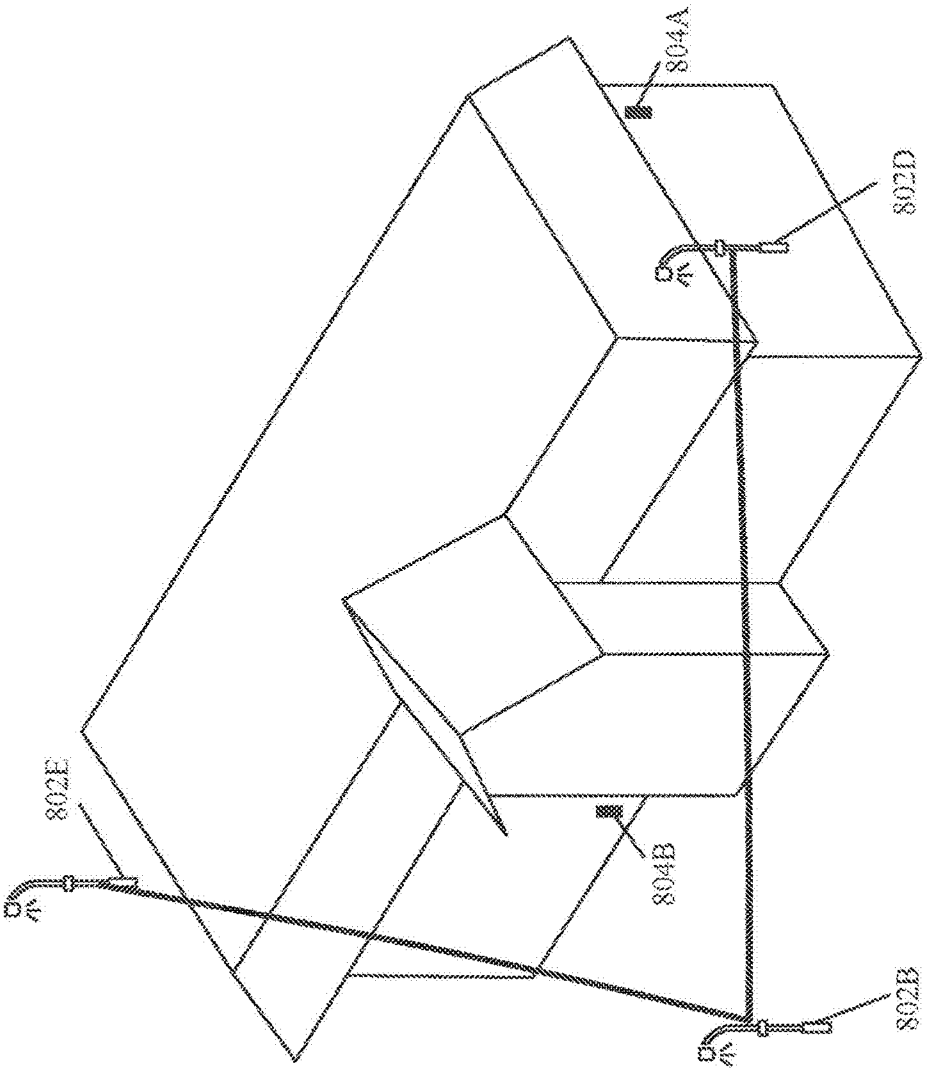
FIG. 8D is a diagram illustrating an exemplary scenario of a mesh network with an exemplary distribution of mesh nodes to overcome signal blockage to enhance 5G coverage for ultra-reliable high-performance communication, in accordance with another embodiment of the disclosure.

FIG. 8D is a diagram illustrating an exemplary scenario of a mesh network with distribution of mesh nodes to overcome signal blockage to enhance 5G coverage for ultra-reliable high-performance communication, in accordance with an embodiment of the disclosure. FIG. 8D is explained in conjunction with elements from FIGS. 1 to 7 and 8B. With reference to FIG. 8D, there is shown a mesh network 800D of a plurality of edge devices 104 that includes the set of child mesh nodes 802B, 802D, and 802E. The child mesh node 802B is linked with the root mesh node 802A that is further linked to the first RAN node 108A of FIG. 8A.

In this scenario, the set of child mesh nodes 802B, 802D, and 802E may be deployed strategically at different locations around a building to increase coverage and overcome signal blockage so that one or more beams of RF signal can reach a location previously not reachable. In an example, a relay may be arranged at a different location (e.g., within the building) that has a very good rate not for range purposes but for coverage and overcoming blockage. For example, at nooks and corners of a building of an enterprise, behind a building, inside the building at different locations so that beam reaches the location where the signal does not get there to overcome blockages and at least to create a line-of-sight path with two neighboring nodes for enhanced coverage and ultra-reliable high-performance communication. In an example, the set of child mesh nodes 802B, 802D, and 802E may be deployed as a private mesh network created for an enterprise. Typically, inter distances among the set of child mesh nodes 802B, 802D and 802E deployed indoors in an enterprise may be 60-90 meters or 70-80 meters. In another example, the set of child mesh nodes 802B, 802D, and 802E may be deployed as a public network or a combination of a public and private mesh network for end-users. The set of child mesh nodes 802B, 802D, and 802E enhance the coverage of the first RAN node 108A (of FIG. 8A) to overcome signal blockage regions within the building (i.e., indoors) as well as outside the building (i.e., outdoors) and provides the seamless connectivity to the first UE 804A and the second UE 804B with consistent high-speed, low latency wireless connectivity with improved coverage for ultra-reliable communication enabled by the path switching mechanism.

Figure 9A:
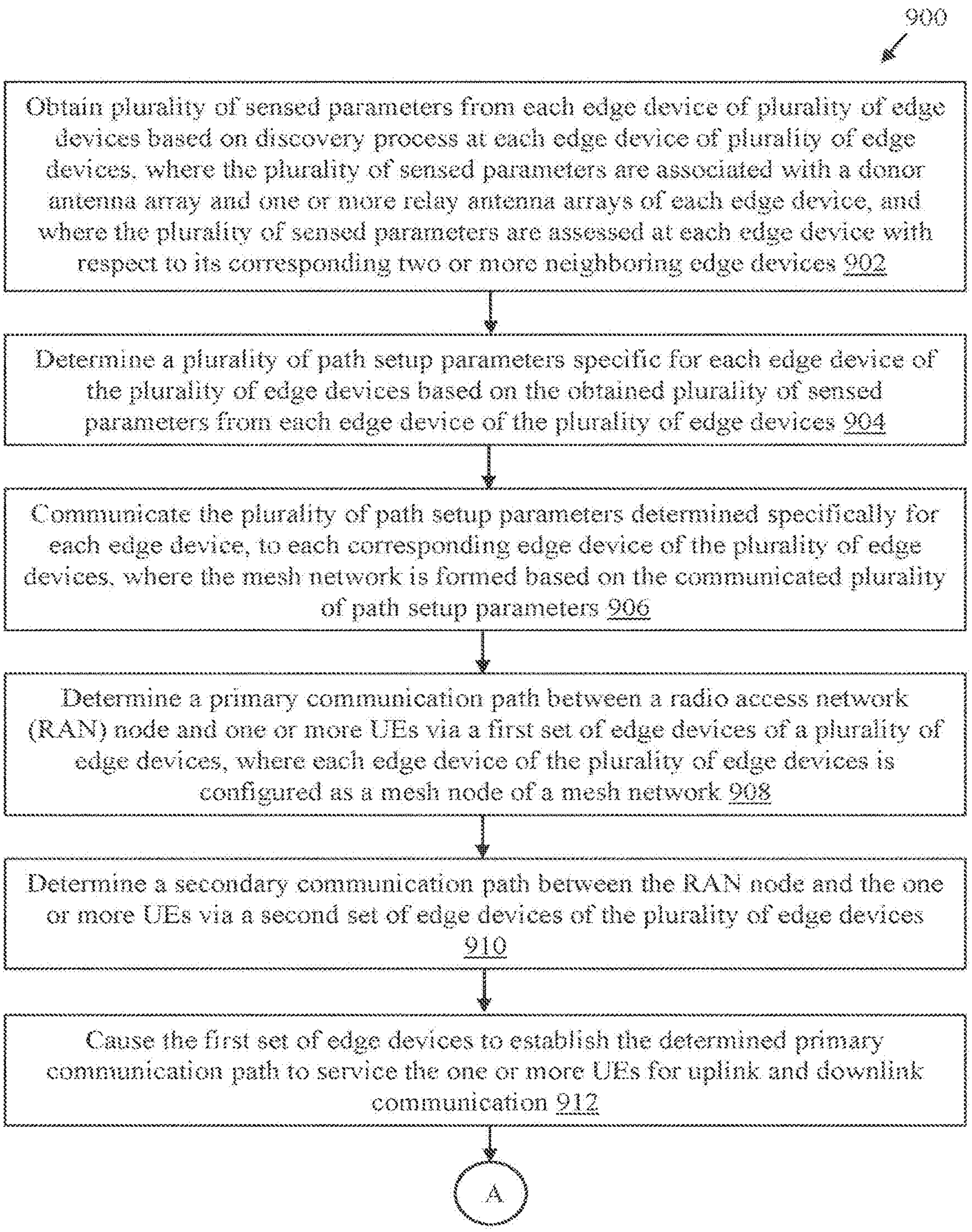
FIGS. 9A and 9B collectively is a flowchart that illustrates a communication method for operating a 5G mesh network for enhancing cellular coverage for ultra-reliable high-performance communication, in accordance with an embodiment of the disclosure.
Figure 9B:
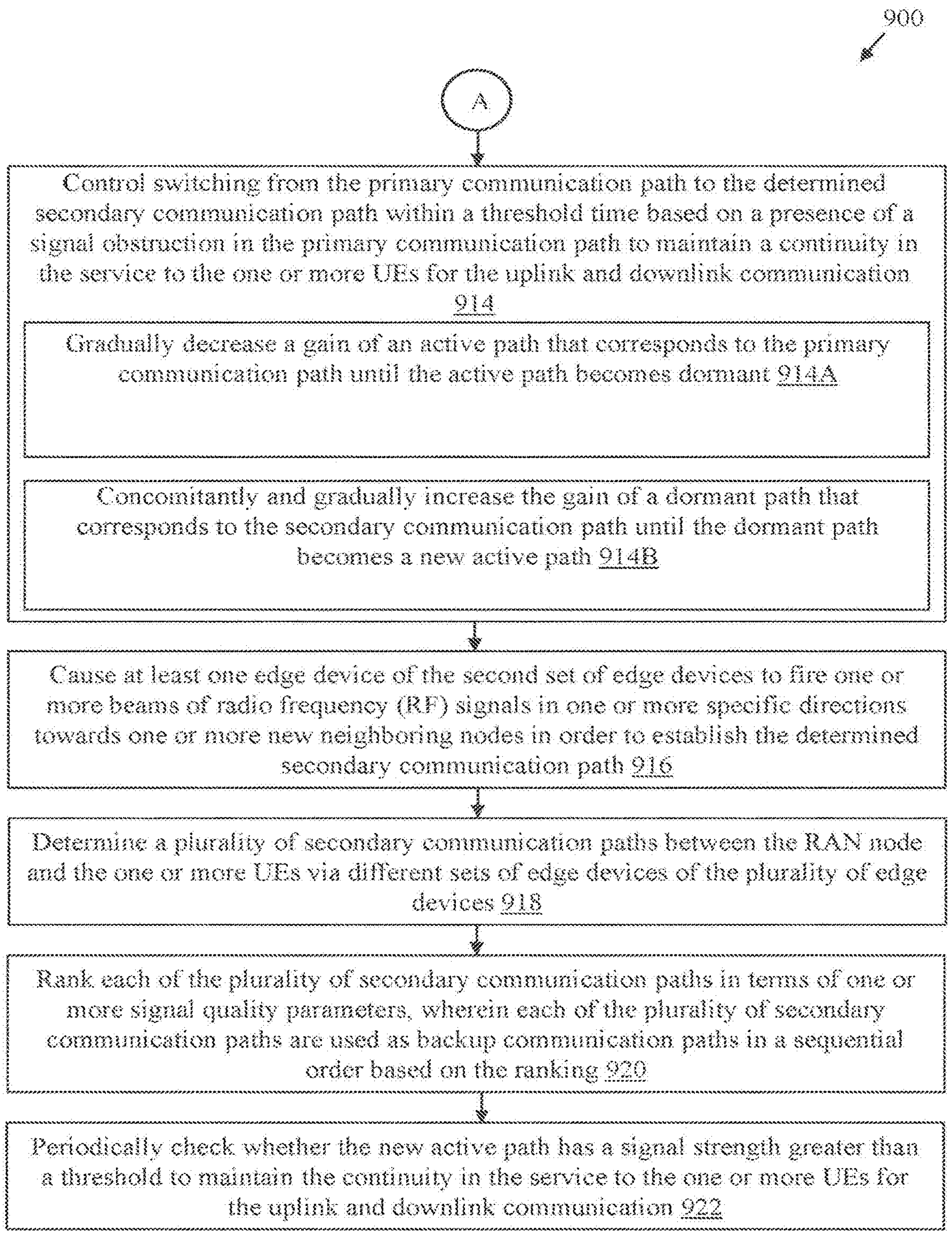

FIGS. 9A and 9B collectively is a flowchart that illustrates a communication method for operating a 5G mesh network for enhancing cellular coverage for ultra-reliable high-performance communication, in accordance with an embodiment of the disclosure. FIGS. 9A and 9B are explained in conjunction with elements from FIGS. 1 to 8D. With reference to FIGS. 9A and 9B, there is shown a flowchart 900 comprising exemplary operations 902 through 922. The operations of the method depicted in the flowchart 900 may be implemented in a central cloud server, such as the central cloud server 102 (FIG. 1).

At 902, a plurality of sensed parameters 208 may be obtained from each edge device of the plurality of edge devices 104 based on a discovery process at each edge device of the plurality of edge devices 104, where the plurality of sensed parameters 208 are associated with a donor antenna array 306 and one or more relay antenna arrays 310 of each edge device, and where the plurality of sensed parameters 208 are assessed at each edge device with respect to its corresponding two or more neighboring edge devices The processor 202 may be configured to obtain the plurality of sensed parameters 208 from each edge device of the plurality of edge devices 104.

At 904, a plurality of path setup parameters 210 may be determined specific for each edge device of the plurality of edge devices 104 based on the obtained plurality of sensed parameters from each edge device of the plurality of edge devices 104. The processor 202 may be further configured to determine the plurality of path setup parameters 210 specific for each edge device of the plurality of edge devices 104 based on the obtained plurality of sensed parameters from each edge device of the plurality of edge devices 104.

At 906, the plurality of path setup parameters 210 determined specifically for each edge device may be communicated to each corresponding edge device of the plurality of edge devices 104, where the mesh network is formed based on the communicated plurality of path setup parameters 210. The processor 202 may be further configured to communicate the plurality of path setup parameters 210 to each corresponding edge device of the plurality of edge devices 104.

At 908, a primary communication path may be determined between a radio access network (RAN) node and one or UEs 106 via a first set of edge devices of a plurality of edge devices 104, where each edge device of the plurality of edge devices 104 is configured as a mesh node of a mesh network. The processor 202 may be further configured to determine the primary communication path between the RAN node and one or UEs 106 via the first set of edge devices of a plurality of edge devices 104.

At 910, a secondary communication path may be determined between the RAN node and the one or more UEs 106 via a second set of edge devices of the plurality of edge devices 104. The processor 202 may be further configured to determine the secondary communication path between the RAN node and the one or more UEs 106 via a second set of edge devices of the plurality of edge devices 104.

At 912, the first set of edge devices may be caused to establish the determined primary communication path to service the one or more UEs 106 for uplink and downlink communication. The processor 202 may be further configured to cause the first set of edge devices to establish the determined primary communication path to service the one or more UEs 106 for uplink and downlink communication.

At 914, switching may be controlled from the primary communication path to the determined secondary communication path within a threshold time based on a presence of a signal obstruction in the primary communication path to maintain a continuity in the service to the one or more UEs 106 for the uplink and downlink communication. The processor 202 may be further configured to control the switching from the primary communication path to the determined secondary communication path within a threshold time based on a presence of a signal obstruction in the primary communication path to maintain a continuity in the service to the one or more UEs 106 for the uplink and downlink communication. In an example, the controlling of the switching from the primary communication path to the determined secondary communication path may be executed via a management plane of the mesh network 112.

In an implementation, the operation 914 may include one or more sub-operations, such as sub-operations 914A and 914B. At 914A, a gain of an active path that corresponds to the primary communication path may be gradually decreased until the active path becomes dormant. The processor 202 may be further configured to gradually decrease the gain of the active path that corresponds to the primary communication path until the active path becomes dormant. At 914B, the gain of a dormant path that corresponds to the secondary communication path may be concomitantly and gradually increased until the dormant path becomes a new active path. The processor 202 may be further configured to concomitantly and gradually increase the gain of a dormant path that corresponds to the secondary communication path until the dormant path becomes a new active path.

At 916, at least one edge device of the second set of edge devices may be caused to fire one or more beams of radio frequency (RF) signals in one or more specific directions towards one or more new neighboring nodes in order to establish the determined secondary communication path. The processor 202 may be further configured to cause at least one edge device of the second set of edge devices to fire one or more beams of RF signals in one or more specific directions towards one or more new neighboring nodes in order to establish the determined secondary communication path.

At 918, a plurality of secondary communication paths may be determined between the RAN node and the one or more UEs via different sets of edge devices of the plurality of edge devices 104. The processor 202 may be further configured to determine the plurality of secondary communication paths between the RAN node and the one or more UEs via different sets of edge devices of the plurality of edge devices 104.

At 920, each of the plurality of secondary communication paths may be ranked in terms of one or more signal quality parameters, and each of the plurality of secondary communication paths are used as backup communication paths in a sequential order based on the ranking. The processor 202 may be further configured to rank each of the plurality of secondary communication paths in terms of one or more signal quality parameters. The processor 202 may be further configured to use each of the plurality of secondary communication paths as backup communication paths in the sequential order based on the ranking.

At 922, it may be periodically checked whether the new active path has a signal strength greater than a threshold to maintain the continuity in the service to the one or more UEs for the uplink and downlink communication. The processor 202 may be configured to periodically check whether the new active path has a signal strength greater than the threshold to maintain the continuity in the service to the one or more UEs for the uplink and downlink communication.

Various embodiments of the disclosure may provide a non-transitory computer-readable medium having stored thereon computer implemented instructions that when executed by a computer causes to execute operations in the central cloud server 102 comprising: determining the primary communication path between the radio access network (RAN) node and one or more user equipment (UEs) 106 via the first set of edge devices of a plurality of edge devices 104, where each edge device of the plurality of edge devices 104 is configured as a mesh node of a mesh network. The operations further comprise determining the secondary communication path between the RAN node and the one or more UEs 106 via the second set of edge devices of the plurality of edge devices 104 and causing the first set of edge devices to establish the determined primary communication path to service the one or more UEs 106 for uplink and downlink communication. The operations further comprise controlling switching from the primary communication path to the determined secondary communication path within the threshold time based on the presence of a signal obstruction in the primary communication path to maintain the continuity in the service to the one or more UEs 106 for the uplink and downlink communication.

Various embodiments of the disclosure may provide the communication system 100 (FIG. 1). The communication system 100 may comprise central cloud server 102 that comprises a processor 202 configured to determine the primary communication path between the radio access network (RAN) node and one or more user equipment (UEs) 106 via the first set of edge devices of the plurality of edge devices 104, where each edge device of the plurality of edge devices 104 is configured as a mesh node of a mesh network. The processor 202 may be further configured to determine the secondary communication path between the RAN node and the one or more UEs 106 via the second set of edge devices of the plurality of edge devices 104 and cause the first set of edge devices to establish the determined primary communication path to service the one or more UEs 106 for uplink and downlink communication. The processor 202 may be further configured to control switching from the primary communication path to the determined secondary communication path within the threshold time based on the presence of a signal obstruction in the primary communication path to maintain the continuity in the service to the one or more UEs 106 for the uplink and downlink communication.

Various embodiments of the disclosure may further provide the communication system 100 (FIG. 1). The communication system 100 may comprise an edge device 104A that may comprise the donor antenna array 306, one or more relay antenna arrays 310, and a processor 314, where the processor 314 may be configured for determining the plurality of secondary communication paths between the RAN node and the one or more UEs 106, and ranking each of the plurality of secondary communication paths in terms of one or more signal quality parameters. The processor 314 may be further configured to controlling of the switching from the primary communication path to the determined secondary communication path comprises gradually decreasing the gain of an active path, and gradually increasing the gain of the dormant path via the management plane of the mesh network. The processor 314 may be further configured for periodically checking whether the new active path has a signal strength greater than a threshold to maintain the continuity in the service to the one or more UEs 106 for the uplink and downlink communication. The processor 314 may be further configured for causing the edge device 104A to fire one or more beams of radio frequency (RF) signals in one or more specific directions towards one or more new neighboring nodes in order to establish the determined secondary communication path.

While various embodiments described in the present disclosure have been described above, it should be understood that they have been presented by way of example and not limitation. It is to be understood that various changes in form and detail can be made therein without departing from the scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g., computer readable code, program code, and/or instructions disposed in any form, such as source, object, or machine language) disposed for example in a non-transitory computer-readable medium configured to store the software. Such software can enable, for example, the function, fabrication, modeling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known non-transitory computer-readable medium, such as semiconductor, magnetic disc, or optical disc (e.g., CD-ROM, DVD-ROM, etc.). The software can also be disposed as computer data embodied in a non-transitory computer-readable transmission medium (e.g., solid state memory or any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the internet and intranets.

It is to be further understood that the system described herein may be included in a semiconductor intellectual property core, such as a microcontroller (e.g., embodied in HDL) and transformed to hardware in the production of integrated circuits. Additionally, the system described herein may be embodied as a combination of hardware and software. Thus, the present disclosure should not be limited by any of the above-described exemplary embodiments but should be defined only in accordance with the following claims and their equivalents.

What is claimed is:

1. A communication system, comprising:

a processor configured to:

control a first set of edge devices of a plurality of edge devices to establish a primary communication path to service one or more user equipment (UEs) for uplink and downlink communication, wherein each edge device of the plurality of edge devices is configured as a mesh node of a mesh network; and control switching from the primary communication path to a secondary communication path within a threshold time based on a presence of a signal obstruction in the primary communication path to maintain a continuity in the service to the one or more UEs for the uplink and downlink communication.

2. The communication system according to claim 1, wherein the secondary communication path is between a radio access network (RAN) node and the one or more UEs via the first set of edge devices.

3. The communication system according to claim 1, wherein the secondary communication path is between a radio access network (RAN) node and the one or more UEs via a second set of edge devices of the plurality of edge devices.

4. The communication system according to claim 3, wherein the processor is further configured to determine a plurality of secondary communication paths between the RAN node and the one or more UEs via different sets of edge devices of the plurality of edge devices, and the plurality of secondary communication paths includes the secondary communication path.

5. The communication system according to claim 4, wherein the processor is further configured to rank each secondary communication path of the plurality of secondary communication paths based on one or more signal quality parameters, and secondary communication paths of the plurality of secondary communication paths are configured as backup communication paths based on the rank.

6. The communication system according to claim 1, wherein the control of the switching from the primary communication path to the secondary communication path comprises decreasing a gain of an active path that corresponds to the primary communication path until the active path becomes dormant.

7. The communication system according to claim 6, wherein the control of the switching from the primary communication path to the secondary communication path further comprises increasing the gain of a dormant path that corresponds to the secondary communication path until the dormant path becomes a new active path.

8. The communication system according to claim 7, wherein the processor is further configured to periodically determined that the new active path has a signal strength greater than a threshold to maintain the continuity in the service to the one or more UEs for the uplink and downlink communication.

9. The communication system according to claim 1, wherein the processor is further configured to control the switching from the primary communication path to the secondary communication path via a management plane of the mesh network.

10. The communication system according to claim 1, wherein the processor is further configured to obtain a plurality of sensed parameters from each edge device of the plurality of edge devices based on a discovery process at each edge device of the plurality of edge devices, the plurality of sensed parameters is associated with a donor antenna array and one or more relay antenna arrays of each edge device, and the plurality of sensed parameters is assessed at each edge device with respect to corresponding two or more neighboring edge devices from the plurality of edge devices.

11. The communication system according to claim 10, wherein the processor is further configured to determine a plurality of path setup parameters specific for each edge device of the plurality of edge devices based on the obtained plurality of sensed parameters from each edge device of the plurality of edge devices.

12. The communication system according to claim 11, wherein the processor is further configured to communicate the plurality of path setup parameters determined specifically for each edge device of the plurality of edge devices, to each corresponding edge device of the plurality of edge devices, wherein the mesh network is based on the communicated plurality of path setup parameters.

13. The communication system according to claim 12, wherein the plurality of path setup parameters for an edge device of the plurality of edge devices comprises location coordinates of at least two neighboring edge devices of the plurality of edge devices to be connected by the edge device, a donor beam index to be selected for the donor antenna array of the edge device, and one or more relay beam indexes to be selected for one or more relay antenna arrays of the edge device.

14. The communication system according to claim 3, wherein the processor is further configured to control at least one edge device of the second set of edge devices to transmit one or more beams of radio frequency (RF) signals in one or more specific directions towards one or more neighboring nodes to establish the secondary communication path.

15. The communication system according to claim 3, wherein the secondary communication path is a backup communication path between the RAN node and the one or more UEs via the second set of edge devices, and the second set of edge devices is different from the first set of edge devices.

16. The communication system according to claim 3, wherein the first set of edge devices and the second set of edge devices comprise a root mesh node communicatively coupled to the RAN node and a set of child mesh nodes communicatively coupled one of directly or indirectly to the root mesh node in the mesh network.

17. The communication system according to claim 16, wherein the processor is further configured to store a plurality of path setup parameters as path tags in a reachability table, each tag of the path tags defines a communication link of a plurality of communication links, the plurality of communication links forms a communication route from the root mesh node to reach a destination node via the mesh network, and the one or more UEs comprises the destination node.

18. The communication system according to claim 17, wherein each of the primary communication path and the secondary communication path is one of the communication link or the communication route.

19. A communication method, comprising:

controlling a first set of edge devices of a plurality of edge devices to establish a primary communication path to service one or more user equipment (UEs) for uplink and downlink communication, wherein each edge device of the plurality of edge devices is configured as a mesh node of a mesh network; and controlling switching from the primary communication path to a secondary communication path within a threshold time based on a presence of a signal obstruction in the primary communication path to maintain a continuity in the service to the one or more UEs for the uplink and downlink communication.

20. The communication method according to claim 19, further comprising increasing a gain of a dormant path, which corresponds to the secondary communication path, until the dormant path is active, wherein the increase in the gain of the dormant path is based on the controlling of the switching from the primary communication path to the secondary communication path.

* * * * *